US010936802B2

(12) United States Patent
White et al.

(10) Patent No.: US 10,936,802 B2
(45) Date of Patent: Mar. 2, 2021

(54) METHODS AND SYSTEMS FOR CREATING CONFIGURABLE FORMS, CONFIGURING FORMS AND FOR FORM FLOW AND FORM CORRELATION

(71) Applicant: WISETECH GLOBAL LIMITED, Alexandria (AU)

(72) Inventors: Richard White, Alexandria (AU); Zubin Appoo, Alexandria (AU); Mikhail Sverdlov, Alexandria (AU)

(73) Assignee: Wisetech Global Limited, Alexandria (AU)

( * ) Notice: Subject to any disclaimer, the term of this patent is extended or adjusted under 35 U.S.C. 154(b) by 0 days.

(21) Appl. No.: 16/846,294

(22) Filed: Apr. 11, 2020

(65) Prior Publication Data
US 2020/0242300 A1  Jul. 30, 2020

Related U.S. Application Data

(63) Continuation of application No. 15/749,072, filed as application No. PCT/AU2016/050678 on Jul. 29, 2016, now Pat. No. 10,643,025.

(30) Foreign Application Priority Data

Jul. 31, 2015  (AU) ................................ 2015903059
Aug. 31, 2015  (AU) ................................ 2015903534
May 6, 2016  (AU) ................................ 2016901683

(51) Int. Cl.
*G06F 17/00* (2019.01)
*G06F 40/174* (2020.01)
(Continued)

(52) U.S. Cl.
CPC ............ *G06F 40/174* (2020.01); *G06F 3/048* (2013.01); *G06F 3/0482* (2013.01);
(Continued)

(58) Field of Classification Search
CPC .... G06F 40/174; G06F 16/9577; G06F 16/95; G06F 3/048; G06F 3/04817;
(Continued)

(56) References Cited

U.S. PATENT DOCUMENTS 5,999,948 A   12/1999  Nelson et al.
6,128,730 A   10/2000  Levine
(Continued)

OTHER PUBLICATIONS

European Patent Office, Extended European Search Report and Written Opinion, EP Patent Application No. 16831967.1, dated Feb. 20, 2019, five pages.
(Continued)

*Primary Examiner* — Laurie A Ries
(74) *Attorney, Agent, or Firm* — Fenwick & West LLP

(57) ABSTRACT

This disclosure relates to creating configurable forms and for configuring forms as well as creating configurable flow form process files and configuring flow form process files and for auto-discovering some or all of the available actions that can be performed on a type of record from a set of form flows process files stored in a data store. Establishing a configurable form can include receiving a form file configured with an acceptability filter and at least one non-mandatory form item that is configured to be either on or off and in the applicability filter, and establishing at least one circumstance under which the non-mandatory form item is to be applied in the form file and generating a configurable form file. On a graphical user interface, along with mandatory form items, non-mandatory form items can be depicted depending upon establishment of circumstances determined by the applicability filter. A search list is disclosed that can nominate without code what data source should be used.

21 Claims, 22 Drawing Sheets

(51) Int. Cl.
- *G06F 16/957* (2019.01)
- *G06F 3/048* (2013.01)
- *G06Q 10/10* (2012.01)
- *G06F 16/95* (2019.01)
- *G06F 3/0481* (2013.01)
- *G06F 3/0482* (2013.01)
- *G06F 3/0484* (2013.01)
- *G06F 3/0486* (2013.01)

(52) U.S. Cl.
CPC ........ *G06F 3/0486* (2013.01); *G06F 3/04817* (2013.01); *G06F 3/04842* (2013.01); *G06F 16/95* (2019.01); *G06F 16/9577* (2019.01); *G06Q 10/10* (2013.01)

(58) Field of Classification Search
CPC .. G06F 3/0482; G06F 3/04842; G06F 3/0486; G06Q 10/10
See application file for complete search history.

(56) References Cited

U.S. PATENT DOCUMENTS

| | | | |
|---|---|---|---|
| 6,314,415 B1* | 11/2001 | Mukherjee | G06F 40/174 706/47 |
| 7,313,757 B2* | 12/2007 | Bradley | G06F 40/151 715/222 |
| 7,770,124 B2 | 8/2010 | Argo et al. | |
| 9,349,026 B2 | 5/2016 | Gianniotis et al. | |
| 9,696,890 B2 | 7/2017 | Kan | |
| 9,722,865 B2 | 8/2017 | Suerbaum et al. | |
| 10,114,801 B2* | 10/2018 | Tzerluk | G06F 16/2246 |
| 2003/0078825 A1 | 4/2003 | Cope | |
| 2005/0160115 A1* | 7/2005 | Starkweather | G06F 16/93 |
| 2005/0172237 A1 | 8/2005 | Cragun et al. | |
| 2005/0289109 A1* | 12/2005 | Arrouye | G06F 16/38 |
| 2006/0036568 A1* | 2/2006 | Moore | G06F 16/168 |
| 2006/0129539 A1* | 6/2006 | Nakatomi | G06F 16/16 |
| 2006/0173773 A1 | 8/2006 | Ettinger | |
| 2006/0259949 A1 | 11/2006 | Schaefer et al. | |
| 2007/0266328 A1* | 11/2007 | Vasey | G06F 40/174 715/762 |
| 2008/0208794 A1 | 8/2008 | Andriamananjara et al. | |
| 2011/0191303 A1 | 8/2011 | Kaufman et al. | |
| 2012/0102543 A1 | 4/2012 | Kohli et al. | |
| 2012/0317135 A1 | 12/2012 | Jin et al. | |
| 2014/0067633 A1 | 3/2014 | Venkatasubramanian et al. | |

OTHER PUBLICATIONS

PCT International Search Report and Written Opinion, PCT/AU2016/050678, dated Oct. 12, 2016, 13 Pages.

United States Office Action, U.S. Appl. No. 15/749,072, filed Jun. 5, 2019, 14 pages.

* cited by examiner

FORM FILE

Header for Form File: Default / Company / Customer / Location / Form Indentifier Optional Form Items
- Form Item #6
- Form Item #7

Non-Mandatory Form Items
- Form Item #4
- Form Item #5

Mandatory Form Items
- Form Item #1
- Form Item #2
- Form Item #3

FIG. 4

METHODS AND SYSTEMS FOR CREATING CONFIGURABLE FORMS, CONFIGURING FORMS AND FOR FORM FLOW AND FORM CORRELATION

CROSS-REFERENCE TO RELATED APPLICATIONS

This application is a continuation of U.S. application Ser. No. 15/749,072, having a 35 USC § 371(c) date of Jan. 30, 2018, which is a 35 USC § 371 National Stage Entry of PCT Application PCT/AU2016/050678, filed on Jul. 29, 2016, which claims the benefit of Australian Provisional Application No 2015903059 filed on 31 Jul. 2015, Australian Provisional Application No 2015903534 filed on 31 Aug. 2015, and Australian Provisional Application No 2016901683 filed on 6 May 2016. The contents of each application above are incorporated herein by reference.

TECHNICAL FIELD

Disclosed are methods and systems for creating configurable forms and for configuring forms as well as creating configurable flow form process files and configuring flow form process files. Further disclosed are methods and systems for form flow and form item, record and/or form correlation.

BACKGROUND

Forms including executable form items can be built in a number of ways. Traditionally, they are designed by a business analyst or designer and then coded by a programmer. Particularly in the case of systems and methods that require user interaction and input, executable content, and in particular form items are displayed in a sequence, order or flow. The flow of executable forms is typically pre-programmed by vendors or suppliers. To suit a customer's needs and requirements, customized modifications are often made by the supplier or vendor, as they typically require some modification of the underlying system programming code. While some systems allow a user to modify or create content, these changes are typically limited to changing how the content is displayed, such as content text and positioning.

Most content, and in particular forms, are designed by a business analyst or designer and then coded by a programmer. Particularly in the case of systems and methods that require user interaction and input, the content displayed and the sequence, or flow of the content, is typically pre-programmed by vendors or suppliers. To suit a customer's needs and requirements, customized modifications are often made by the supplier or vendor, as they typically require some modification of the underlying system programming code. Further, since the systems are often proprietary, customers or users are usually prevented from modifying the content or flow, with the exception of a few rudimentary and often cursory settings.

While some systems allow a user to modify or create content, these changes are typically limited to changing how the content is displayed, such as content text and positioning. Further, while content can be lightly customized by a user, the content flow usually cannot be customized at all. That is, previous systems are pre-programmed to display content in a certain order or sequence. The order can change based on a user's input, but these changed orders are also pre-programmed into the overall system.

The use of pre-programmed systems, which requires customization for individual users and customers, not only limits the scope of the system, but also limits its lifespan. For example, when regulations change, content, and in particular forms may need updates. When system updates are required, a customer or user must request or receive a system update from the supplier. The system updates take time to create and must also be customized to work within existing customized systems. The updated and customized work leads to lengthy delays before the system is updated. Due to the difficulty of customizing such systems and the lengthy updating process, user or customer costs can be relatively higher than the base system price for the system depending on the amount of customization desired.

Enterprise-type software systems are purpose-designed software used to satisfy the needs of an organization rather than the individual. For example, an enterprise-type software system can use forms that conform to current regulations or standards. A form may include one or more form items which is a display screen item within a product that allows for data entry and data management. When these regulations or standards are updated, the current forms usually becomes obsolete, which requires either creating a new version of the form or the creation of additional forms to fill the regulatory gap between the existing form and the new regulations. Alternatively an updated, new version of the form may be created but it must be programmed to exist and function across multiple platforms, often on a platform-by-platform basis. Therefore, the timeframe and expense of updating forms are increased.

SUMMARY

In particular industries, for example, the freight forwarding industry, there are layers of businesses which utilize forms. Most are familiar with international cargo vessel carriers, such as container ships, air cargo and train carriers. However, before the goods arrive at the container ship or air cargo carrier as well as after the goods arrive at a port or terminal, there are several layers of businesses operating to move the goods to and from the international carrier. In particular, there are freight forwarders who do not actually move the goods, but utilize the services of ground carriers, oftentimes many, to move the goods. The freight forwarders may need executable forms which are standardized for use by their ground carriers. In this way, it would be beneficial were a freight forwarder able to provide to their carriers forms that are configurable but can capture essential information (in executable form items) for the freight forwarder.

The same would be true of other industries, including any kind of executable content deliverer. For example, an industry which utilizes independent sales consultants such as insurers may need standardized but configurable forms. Another example is banks and independent loan brokers. Each of these industries have a forms that they wish to be configurable while capturing essential standard information. For example, were a loan broker to only work in commercial real estate, any executable forms of the bank that included queries (executable form items) about residential real estate would not be relevant to that particular broker. In this case, it may be beneficial to allow the broker to eliminate the form items in the executable form relating to residential borrowers or add other form items. Additionally, referring to the order or sequence of a form flow, designers may wish to provide circumstances under which the flow form can be configured. Moreover, it may be beneficial if the format were standardized as well. In this way, data may be more easily extracted from a form and therefore more useful for a business or other entity.

Disclosed are methods and systems of a graphical user interface of a computational device including depicting an arrangement of indicia representative of form items including a first form item that is a mandatory form items, such indicated by an mandatory item icon and including a second form item that is non-mandatory form item, such indicated by a non-mandatory item icon, whereby the non-mandatory item icon can be selected to turn off or on the non-mandatory form item so that it can either be included in an executable form or not be included in an executable form and an arrangement of indicia representative of an executable form whereby indicium related to the mandatory form item is displayed and indicium related to a non-mandatory form is displayed if the non-mandatory item icon was selected to be turned on. Also disclosed are methods and system of a graphical user interface including an arrangement of indicia representative of an executable form whereby indicium related to the mandatory form item is displayed and indicium related to the non-mandatory form is not displayed if the non-mandatory item icon was selected to be turned off.

Also disclosed are methods and systems for configuring form files including form items. A form file is configured with an acceptability filter for establishing in the form file which non-mandatory form items are to be configurable, that is, either on or off. The applicability filter establishes the circumstances under which the non-mandatory form items will be applied in the executable form file.

The circumstances under which the non-mandatory form items will be applied in the executable form file can include settings provided by a designer or developer that limit the circumstances under which particular configurations can be made. For example, if a developer wishes that only certain users can enable a time zone input information of a form item of an executable form, then the circumstances would include the certain users. On the other hand, were a developer to wish that only certain company departments can enable monetary exchange rate information form items of a form, then the circumstances would include the company departments. With the status of non-mandatory form items, that is, turned either on or off according to the circumstances set out in the applicability filter, a modified executable form file can be generated.

Also disclosed are methods and systems for configuring form flow process files. The form flow process files provide a sequence, order or flow of a plurality of forms and can provide access to form files via at least one path. A form flow process file can be configured with an acceptability filter for establishing in the form flow process file non-mandatory paths that are configured to be either on or off. In the applicability filter, establishing the circumstances under which the non-mandatory paths can be configured, a modified form file process file can be generated. Form process files are described in detail below.

The applicability filter can provide filters for at least one of, but not limited to, default, company, branch, department, customer, location, form identifier and form flow identifier. Different parameters are within the scope of this discussion. The applicability filter can be provided by a header of an executable form file or of a form flow process file. Furthermore, the applicability filter can be provided in any suitable manner so that it provides the circumstances to determine whether non-mandatory form items may be selected as on or off.

The disclosed systems and methods for creating or establishing a configurable form can include receiving a form file configured with an acceptability filter and at least one non-mandatory form item that is configured to be either on or off and in the applicability filter, establishing at least one circumstance under which the non-mandatory form item is to be applied in the form file and generating a configurable form file.

The disclosed methods and systems for a configuring form can include receiving a form file including at least one non-mandatory form item that is configurable to be either on or off, the executable form file having an applicability filter to determine whether to allow selection of a non-mandatory form item as on or off. Depending upon establishment of one or more non-mandatory form items as on or off as the applicability filter allows, a modified form file including at least one non-mandatory form item can be established.

The disclosed methods and systems for creating or establishing a configurable form flow process file can include receiving a form flow process file configured to provide access to at least one form file in accordance with a path, the form flow process file configured with an acceptability filter and at least one non-mandatory path that is configured to be either on or off and in the applicability filter, establishing at least one circumstance under which the at least one non-mandatory path is to be applied in the form file and generating a configurable form flow process file.

Disclosed are methods and systems for modifying a form flow process file, that can include receiving a form flow process file configured to provide access to at least one form file in accordance with a path, the form flow process file configured with an acceptability filter and at least one non-mandatory path that is configured to be either on or off. Depending upon whether the applicability filter allows selection of the non-mandatory path as on or off, selecting whether to establish non-mandatory path as on or off and with at least one non-mandatory path established, generating a modified form flow process file.

Depending upon how forms are defined according to their data type and/or their control type, many different forms may be utilized in a single transaction or process. For example, forms are used in freight forwarding can refer to different aspects of accounting, brokerage, a container yard, forwarding, netting, organisations, ratings, transit warehouse, and the like. These forms may be connected by a form flow stored as a form flow process file which provides logic conditions that lead a user from one form of the form flow process to another form. That is, a form flow defines a logical pathway by which one or more of related forms are accessed. Development of forms and form flows is described in detail below.

When a form, form file or a record is made accessible by a form flow process file, the form can be retrieved when conditions of the form flow are met. In the process of building forms, it may be beneficial to build form flows at the same time. On the other hand, once a particular type of form flow has been built, it may be reusable. If the form flow process file has been stored, a form designer can access it to build a form flow process with other forms.

In the underlying product discussed below which is used to design and build forms and form flows, predetermined form items can be provided. Various industries will have typical requirements for forms, for example, an insurance business may have different requirement than a car dealership. Therefore the form items can be tailor made to the particular industries in a forms designer. In the presently described product, the executable features of the form items are not hardcoded until the form items is clicked and dragged into the form designer screen. In this way, the executable code/control is separately stored and can be updated separately from the unexectuable form item indicia.

Form items that can be clicked and dragged onto a designer screen from a list to create a form may have particular data types. When executable, form items may have particular types of executable features provided for example by controls being of particular control types. When a user wishes to reuse a form flow process file that was either generated on the system, or is a template provided as a product, without the benefit of the presently described methods and systems, a user needs to search through stored form flow process files by name hoping to find one that is applicable to the form file of interest The user most likely will not find one that works for the desired purpose because data type codes and control type codes are not human readable and are embedded. If it were possible, in any event, a user would spend a lot of time doing so. The problem presented here is one that culminates from the underlying computer-based product itself. The product is computer based and therefore, the disclosed systems and methods to provide a solution to a problem with the system is therefore a computer-based solution. The solution provided is that instead of a user searching through the machine readable code of the stored form flows process files to determine which of the processes that they represent may be applicable to the particular record, form or form item, the presently described methods and systems provide that form flows are made available to a user via the user interface based upon an identified form item. The identified form item may only include a data type, particularly if it has not become part of a form yet. If it has been hardcoded with a control as described below, and is part of a form, it may include a control type. Accordingly, there exists a need for executable content and content flow creation systems and methods, and more particularly executable form and form flow creation systems and methods that can allow a user to readily apply a form flow process to a form or form item.

As background to terminology used herein, executable means the input or interaction, either of a user or remote input, either pulled or pushed can cause an output to occur. An example of executable content is an executable form item that represents form logic. For example, when a form item field is filled in by a user or other means, data is delivered to a server as output. Other examples can include selecting an option where when selected, an output occurs such as a user's choice is provided to a server. Multiple executions can occur. For example data can be saved to a server, and another executable form item can be displayed or the path through subsequent content to be followed is delivered. The particular output that occurs as a result of the execution can include any type of output. For example, input or interaction with executable content can lead to generation or display of unexecutable content such as an alert.

During the creation of an executable form, there is a need to be able to view the form as it would present on various form factors. Moreover, there is a need to allow a user to arrange a plurality of forms in an order or form flow. A form flow on a display can resemble a flow chart so that as the forms are being used, they can execute in a particular order depending upon the responses to form items of the forms of the form flow as well as based on other external factors (such as the country of operation, or the month of the year etc.). In this way, a user can build reusable forms and readily update the forms and utilize them in one or more processes. A distinction is made between indicia representative of a form item and an executable form item. The indicia is available for selection by a user to become an executable form item in a form file as discussed in the section below referring to the underlying methods and systems. Similarly, flow control indicia is available for selection by a user to become a flow control within a form flow process.

Disclosed are systems and methods for a designer device including a display device, a processor and storage, a method of correlating a form file to a form flow process file, wherein the form file includes at least one of a data type or a control type and is stored in a form file storage and a plurality of form flow process files include control types are stored in a form flow process files storage, the individual form flow process files including reference to one or more form files, including displaying on the display device a representation of at least one form file and in response to user input via the display device referring to the form file, correlating the form file to one or more form flow process files stored in form flow process files storage, the correlating based at least in part by the data type or the control type of the form file. Furthermore, in response to the previous correlating step, initiating depiction of a list of one or more representations of form flow process files that include a reference to the form file and displaying the list of one or more representations of form flow process files that relate to the form file.

Disclosed are computer implemented methods and systems for rendering a representation of a record on a graphical user interface, the form or record being of a type upon which a particular action can be performed and then auto-discovering all of the available actions that can be performed on that type of record or on an individual record from a set of form flows process files stored in a data store. In this way the disclosed methods and systems can utilize a search list that can nominate without code what data source should be used. The disclosed methods and systems are for correlating at least one form flow which is configured to include a form or a record of the type upon which the particular action can be performed to a form flow and then rendering on the graphical user interface at least one icon representing a form flow from the set of form flows as available for selection by a user, the at least one form flow being configured to include a record of the type upon which the particular action can be performed, and upon receiving an instruction of a selection of a form flow icon, configuring the record as an executable element of the selected form flow so that the particular action can be performed upon the form or record.

Further disclosed is a method of a computer implemented system including a display device, a processor and storage, the method accessing form flow process files stored in storage, the method including displaying a representation of a first form and a second form on a display, the first form and second form configured with at least one of a data type and a control type and providing flow control indicia representative of executable flow controls on a display screen. The method further includes receiving instructions to select a first flow control indicium of the flow control indicia, invoking the selected flow control in conjunction with the displayed first form and second form and displaying on the display screen or another display screen, a first form flow diagram including an arrangement of the representations of the first form and the second form in conjunction with the invoked selected flow control and then saving a first form flow process file including an indication of the data type or control type of the first form and the second form and an indication of the selected flow control comprising a first form flow process file in storage with other form flow process files. Further disclosed is subsequently, displaying the indicia relating to the first form, correlating by at least one of the data type and the control type of the first form to the form flow process files stored in storage that is applicable to the first form, displaying a representation of at least one form flow process file for selection by a user and receiving instructions to select a form flow process file.

Also disclosed is a method of a computer implemented system including a display device, a processor and storage, the method for generating a form flow process file that provides control logic between at least two forms, each having at least one of a data type and a control type, including transmitting multiple flow indicia representative of flow controls and an indicia representative of at least one form to a designer device, receiving instructions from the designer device that includes a selection of at least one flow control indicium, invoking a flow control upon selection of the flow control indicium in conjunction with the graphical representation of the at least one form to generate a form flow diagram representative of a form flow process file that includes an arrangement of the at least one form and the at least one invoked flow control and storing the form flow process file so that it is accessible when displaying a representation of the at least one form on the designer device.

BRIEF DESCRIPTION OF DRAWINGS

FIG. 4 depicts a form file in a different arrangement to those of FIGS. 1, 2 and 3;

DESCRIPTION OF EMBODIMENTS

Figure 1:
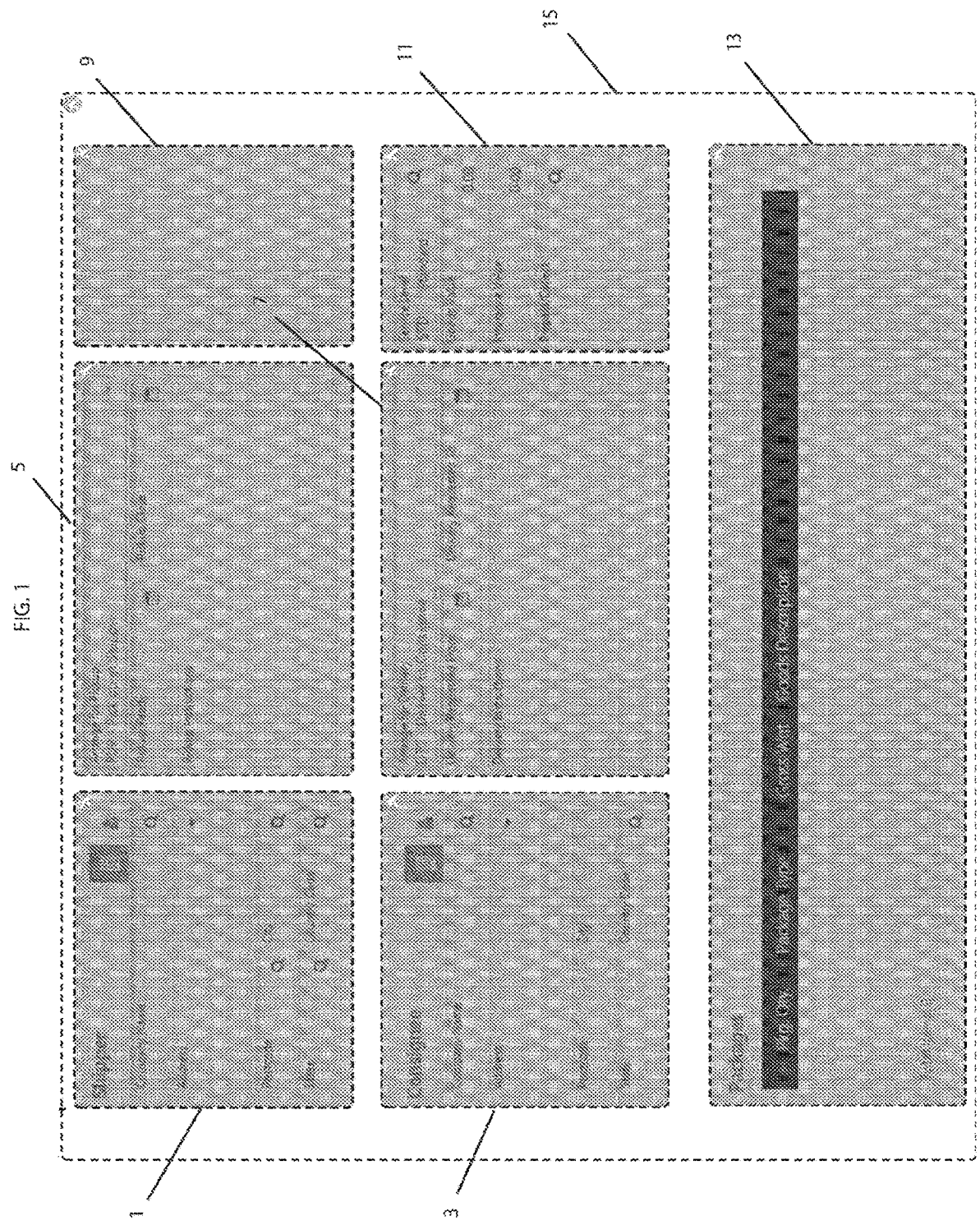
FIG. 1 depicts an example executable form layout that, for example, may be provided upon a graphical user interface.

FIG. 1 depicts an example executable form layout that, for example, may be provided upon a graphical user interface. Below is a detailed description, Systems and Methods for Executable Content and Executable Content Flow Creation, which describes a manner in which to build executable forms files and form flow process files. While the terminology of an executable form file and a form flow process file can be reference in the detailed description below, the below description is not intended to limit the manner in which to build an executable form or a flow form process file as applied to the presently disclosed systems and methods.

The example form layout depicted in FIG. 1 can be rendered on a graphical user interface of a computational device. The location storing the form file can be remote or local. The form file can retrieved and displayed so that it shows different sections of a form in FIG. 1, 2, 3, or 4, or any other suitable manner.

Depicted in FIG. 1 are a shipper section 1, the consignee section 3, the pickup details 5, the delivery details 7, a blank section 9, a service level section 11 and a packages section 13. These example sections can be executable forms which are surrounded by a dotted line to indicate that they include one or more form items. There is an exterior dotted line 15, in this example, indicates the sections represent an executable form.

The dotted lines are representative of a particular executable form configuration. There can be more or fewer dotted lines. The dotted lines or any other representative bounding or partitioning depiction can be positioned wherever a user determines they should be. The positions of dotted lines are not necessarily relevant to the scope of this discussion.

Figure 2:
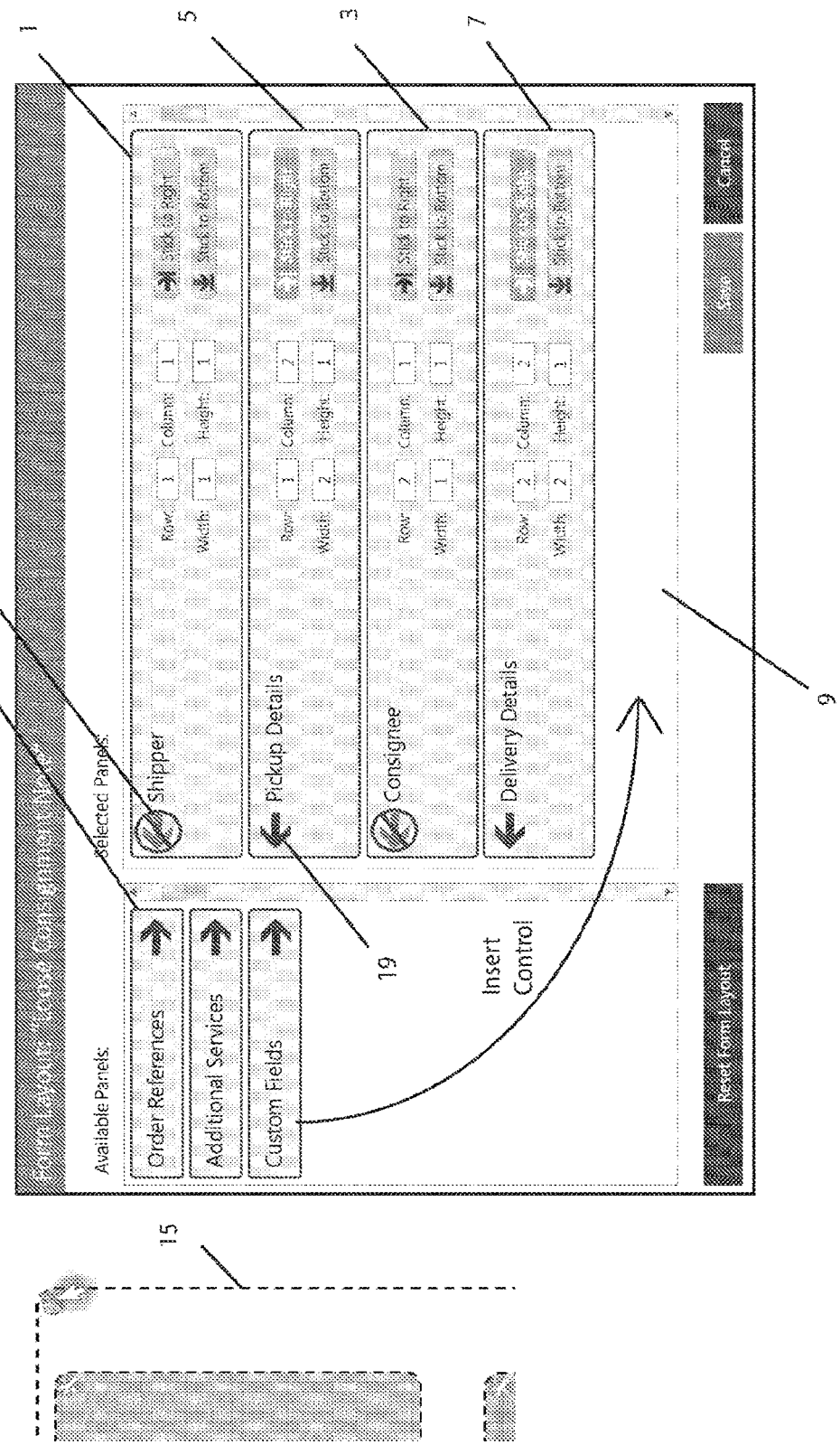
FIG. 2 depicts a graphical user interface where the fields inside the exterior dotted line have been selected, that is, the outermost panel.

FIG. 2 depicts a graphical user interface where the fields inside the exterior dotted line 15 have been selected, that is, the outermost panel. The shipper section 1, the consignee section 3, the pickup details 5, the delivery details 7 are shown. The icon 17 depicts a mandatory form item and the icon 18 depicts a non-mandatory field item. The indication of mandatory and non-mandatory can take any form. Non-mandatory is also referred to as optional.

In FIG. 2, the items that are depicted as non-mandatory, the pickup details 5, the delivery details 7, are exhibited on the graphical user interface depending upon the applicability filter. The applicability filter is discussed in more detail below. On FIG. 2, there are also available or optional form items 21. The optional form items 21 are non-mandatory as well and can be provided on the graphical user interface depending upon whether the applicability filter allows selection of the non-mandatory form items as on or off. The manner in which the graphical user interface is depicts optional form items 21 and non-mandatory form items 5 and 7 is a matter of design choice and any suitable arrangement of non-mandatory form items is within the scope of this discussion. Non-mandatory form items do not need to separated into optional form items.

One or more of the optional form items 21 can be inserted into the form, for example at blank section 9. As is discussed in detail below, the indicium can dragged from a list 21 into the form view. When, for example the indicium of an item of list 21 is clicked, dragged or placed, the system can insert a code making the form item executable. While the presently disclosed systems and methods are not necessarily directed to the feature of inserting an executable code when selected, such systems and methods are within the scope of this discussion. Other actions other than clicking, dragging or placing may cause the code to be linked or bound to the selected form item.

Figure 3:
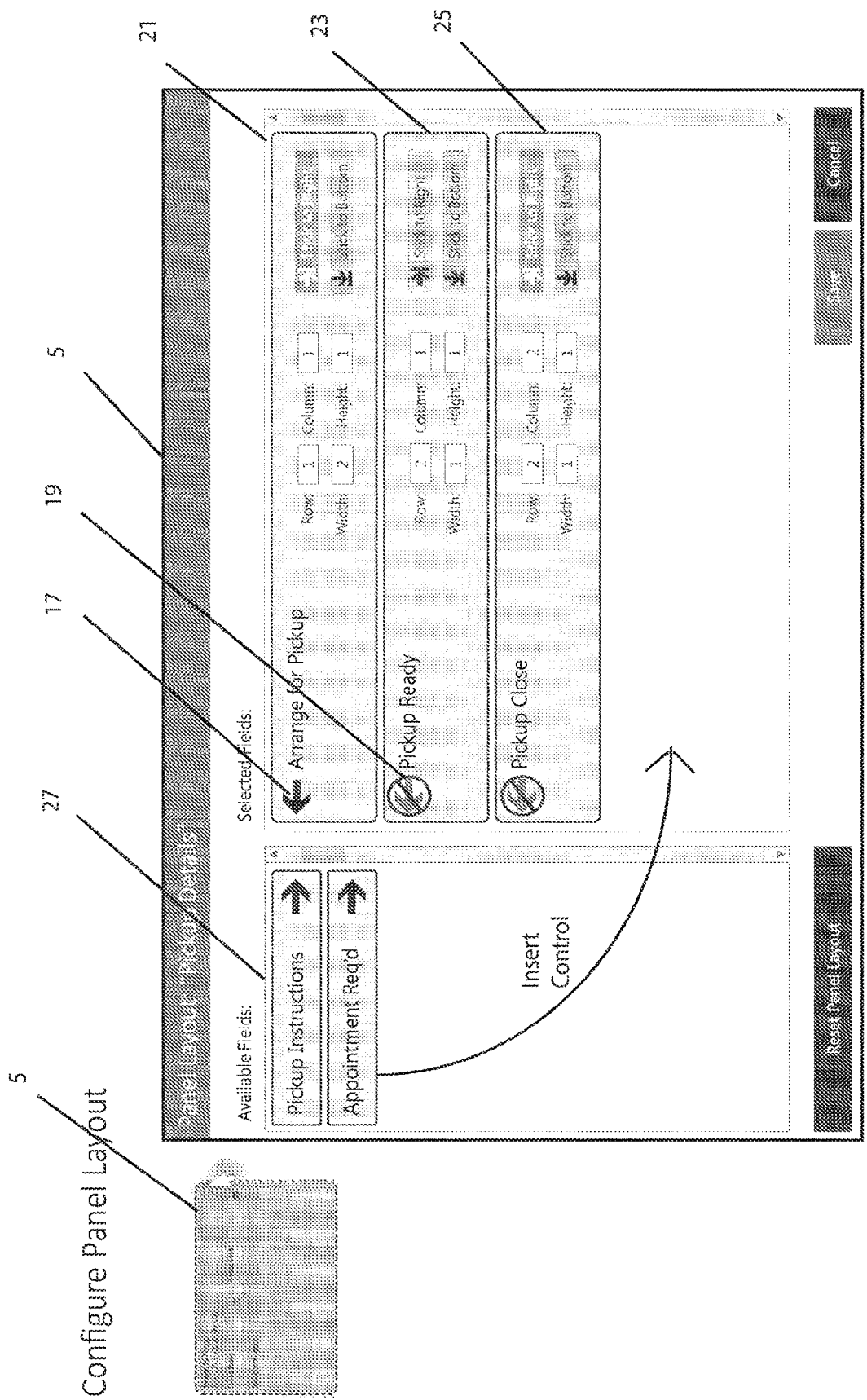
FIG. 3 further shows a mandatory form item and a non-mandatory form item.

Referring to FIG. 3, a portion of the form, a panel, including form items 5 can be rendered on a graphical user interface. The design features of the rendering can be as the user or designer chooses. In this example and that of FIG. 2, the form items on the designer's display further includes design choices of placement. Any manner in which to provide to the user choices in design is within the scope of this discussion.

FIG. 3 further shows a mandatory form item 21 and non-mandatory form items 23 and 25. The items that are depicted as non-mandatory, the pickup ready 23 and the pickup close 25, are exhibited on the graphical user interface depending upon whether the applicability filter. Also shown are available fields 27 that are exhibited on the graphical user interface depending upon whether the applicability filter. In addition to turning non-mandatory fields on/off, it would be beneficial if all form items could be repositioned within an executable form.

FIG. 4 depicts a form file in a different arrangement to those of FIGS. 1, 2 and 3. Mandatory form items such as 5 and 7 of FIG. 2 or form item 21 of FIG. 3 are depicted in a column 31. Non-mandatory form items such as 1 and 3 of FIG. 2 or form items 23 and 25 of FIG. 3 are depicted in column 33. Optional (which are also non-mandatory) form items such as form items in list 21 of FIG. 2 and form items in list 27 of FIG. 3 are depicted in column 35.

FIG. 4 further depicts a header 37 for the form file. A header commonly refers to supplemental data, oftentimes used for parsing, placed at the beginning of a block of data being stored or transmitted. In data transmission, the data following the header are sometimes called the payload or body. The header 37 can provide an applicability filter to determine whether to allow selection of a non-mandatory form item as on or off. In this example, the header for the form file can include a default setting, the company, the customer, the location, and the particular form file identifier. A form file identifier is described below.

Therefore, for example, a bank that utilises loan brokers can provide a form file and based upon the particular brokers using the form, identified as companies listed, the bank can provide non-mandatory form items and optional (which are also non-mandatory) form items. The header can provide further granularity in which entities or persons can turn on or off non-mandatory form items.

Figure 5:
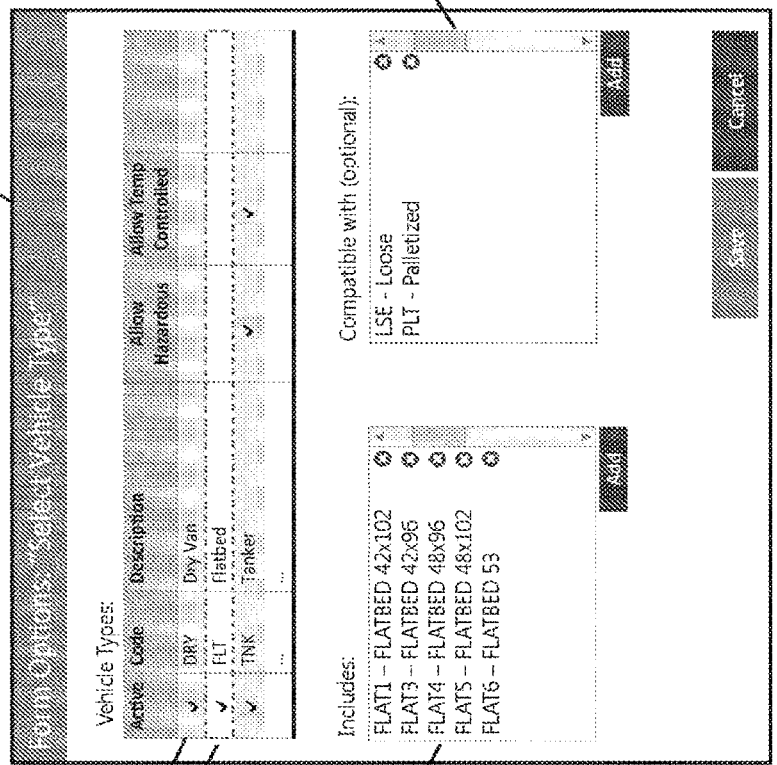
FIG. 5 shows, in the carrier business, examples of non-mandatory form items that can be selected.
Figure 5:
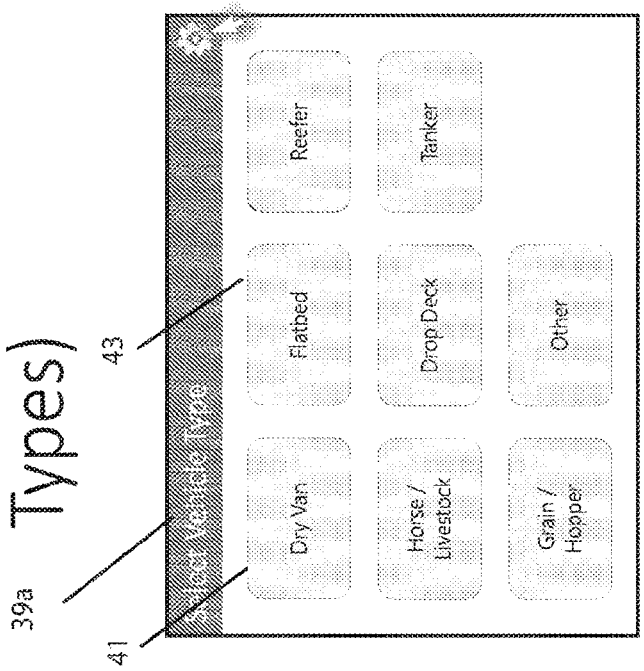

FIG. 5 shows, in the carrier business, examples of non-mandatory form items 39 that can be selected. The non-mandatory form items 39a and 39b illustrate different manners in which to present form items. If a company only uses two of the types listed, a dry van 41 and a flatbed 43, then it could select the two form items to include in their configured form file. Other non-mandatory form items could be presented as well. By selecting the flatbeds 43, a list 45 of different types of flatbeds may be presented. Furthermore, another list 47 may be presented as well. Lists 45 and 47 may provide non-mandatory form items from which to select to include in their configured form, and so on.

A user could be one of the entities delineated in the example header. Upon receiving an executable form file, at for example, a user's computer, the applicability filter shown in FIG. 4 as a header, can determine whether to allow selection of a non-mandatory form item as on or off. In FIG. 5, depending upon whether the applicability filter allows selection of the non-mandatory form items as on or off, in this case, selecting a form item relating to vehicle type, a selection can be made whether to establish non-mandatory form items as on or off. With the non-mandatory form items established, a modified or configured executable form file including at least a mandatory form item can be generated and saved for use, and/or subsequent modification.

Figure 6:
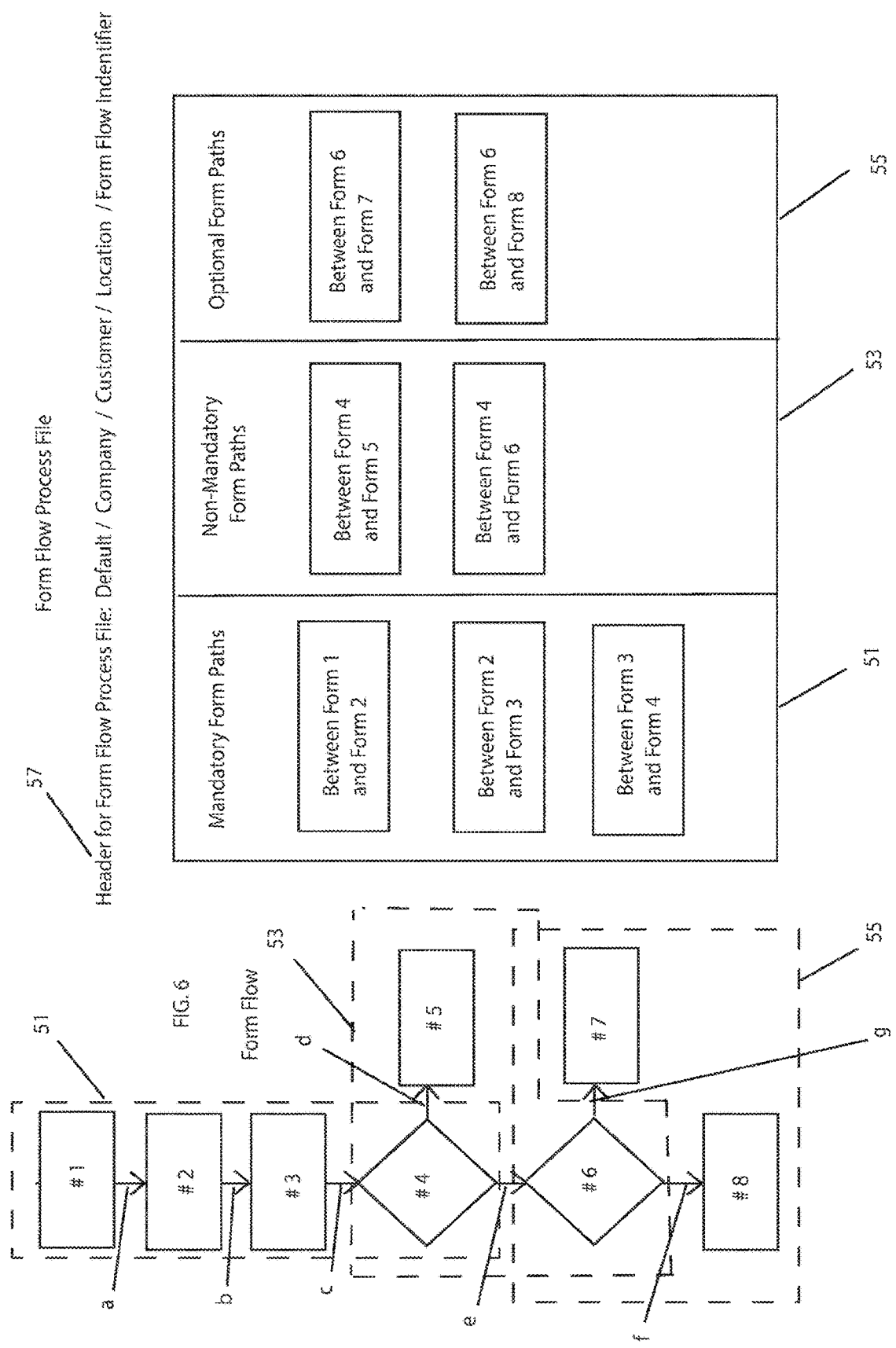
FIG. 6 depicts a flow chart that can represent a form flow process file including mandatory and non-mandatory paths in generating a form flow process file.

As mentioned above, the same process can be used for configuring a form flow process file. Just a form file can be configured, disclosed are methods and systems for configuring a form flow process file. FIG. 6 depicts a flow chart that can represent a form flow process file. As described in detail below, executable forms can be arranged in an order or sequence that can resemble a flow chart and be stored as a form flow process file. In a flow chart, the possible paths to follow in the order or sequence can be indicated by arrows. In this example, there are arrows a, b, c, d, e, f, and g. As described below, a flow form process file can be stored. A user, for example in a header, identified as a company, a customer, a location or any other suitable designation, can receive a form flow process file configured with an acceptability filter.

Briefly turning to FIG. 6 there are mandatory and non-mandatory paths. In generating a form flow process file, for example, in the manner described in detail below, a form designer can also establish in the form flow process file, mandatory paths 51 that are configured to be on and non-mandatory paths 53 and/or 55 that are configured to be either on or off. The example mandatory paths 51 are paths a, b and c of FIG. 6. Non-mandatory paths 53 are paths e and d of FIG. 6. Optional paths (which are also non-mandatory) are paths f and g of FIG. 6. In the applicability filter 57, the designer can establish the circumstances under which the mandatory paths 51 and non-mandatory paths 53 and/or 55 will be applied in the form flow process file. By a user, with the mandatory 55 and non-mandatory paths 53 and/or 55 established, and the circumstances of the applicability filter established, a modified or configured form file process file can be generated and stored for use, or later modification.

As discussed below, there is benefit for building executable form files and form flow process files in the manner describe below. As discussed above, it may also be beneficial to provide for the ability to customize or configure form files and form flow process files used by different entities or people without the need to recode the forms. Configurable form files and form flow process files can also include content that is not executable. Any executable content is within the scope of this discussion.

There exists a need for executable content and content flow creation systems and methods, and more particularly executable form and form flow creation systems and methods that can allow a user to readily access and/or apply a form flow process to a form or form item. A form flow process file can be created by the user of this system or can be provided as a template in a product. A detailed description of the underlying systems and methods is provided below.

Disclosed are computer implemented methods and systems for auto-discovering some or all of the available actions that can be performed on a type of record from a set of form flows process files stored in a data store. In this way the disclosed methods and systems can utilize a search list that can nominate without code what data source should be used. The disclosed methods and systems are for correlating at least one form flow which is configured to include a form or a record of the type upon which the particular action can be performed to a record, form or form item and upon receiving an instruction of a selection of a form flow icon, configuring the record as an executable element of the selected form flow so that the particular action can be performed upon the record, form or form item.

Briefly referring to the underlying systems and methods, disclosed are methods and systems that allows a user to access indicia representing executable form items, but which are not executable, click and drag them into a space on a display screen, and build a form of executable form items. When the unexecutable form items are selected (for example, by clicking and dragging), a control code is inserted and the form item then becomes executable. Because the form items become executable when displayed in, for example, a form viewer, a user will not need to consider how to define the manner in which the form items function. That is a user, in a single step, will select a form item that is a particular type to the build the form, and this form will immediately be executable. The disclosed methods and systems allow the executable form items to be arranged and rearranged as the user is building the form. The form can then become part of a form flow, that is a flow chart, that indicates controls such as 'if', 'then', 'else if', 'goto', 'jump', 'while'.

As described above, a form flow provides a sequence of events. For example, the form flow process file may include instructions to: show form 1, show form 2, run a rule, or jump to show form 5 automatically. A user may define all of those process steps because those are the types of things the user may want to do on a shipment record. Alternatively, the form flow may be provided with the product in a template form. Either way, in accordance with the presently disclosed processes and methods, rather than manually look those up to a search screen, the flow forms appear automatically.

As mentioned, form items of forms include data types and/or execution codes. When the form flow has a particular type of content and/or execution code associated with it, it can automatically be an option for a form item or form. The form item or form having its type of data (content) and/or execution code is mapped to the form flow. The list of form flow actions is dynamic because as a user is making form flows, and storing them, the list changes.

Figure 7A:
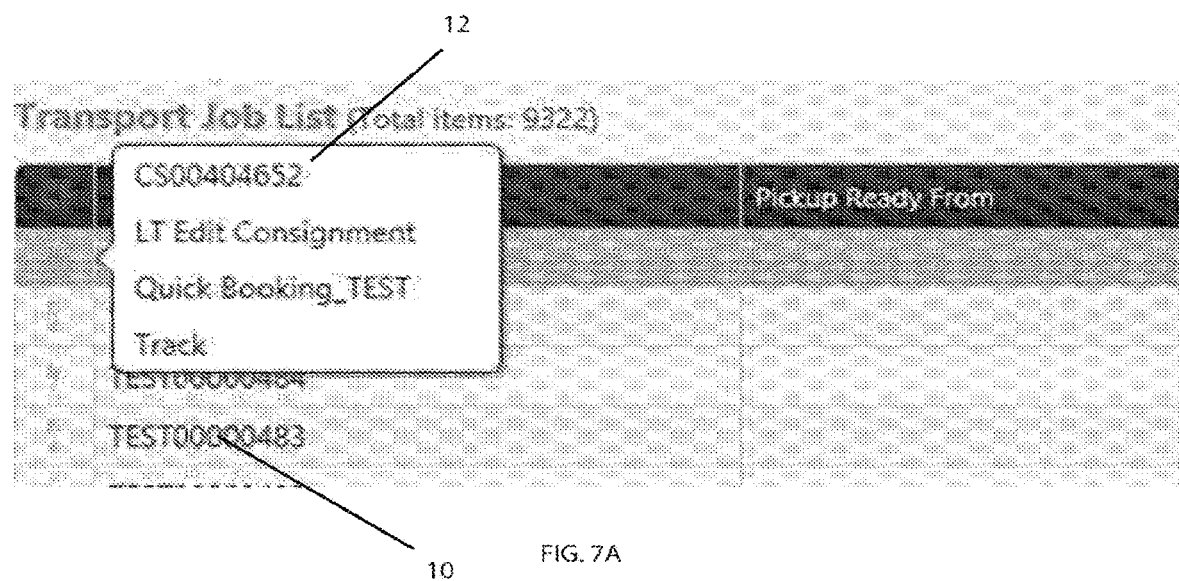
FIGS. 7A and 7B depict a list view and a grid view to access form flows.

Referring to FIG. 7A form items, forms or records may be presented in any manner. That is, the form items, forms or records are represented and rendered on a graphical user interface. Shown on FIG. 7A, form items or forms are depicted as icons in a list 10. These form items, forms or records are of a type upon which a particular action can be performed. That is, if an execution code is associated with them, they are executable. By passing a cursor over the list, or some other method such as right clicking on an item in the list, a user may see menu items 12 that represent form flow files. That is, the form flow files are rendered on a graphical user interface by icons. A rendered form flow process file is configured to include a record, form or form item of the type upon which the particular action can be performed.

Rather than hard coding, form flows that relate to the type of content/record upon which the particular action can be performed are depicted by an icon and rendered, wherein the list can be built dynamically. This process not only provides time savings in building a form flow process that accesses form items, it provides a user with a better understanding of the possibilities available for the use of the product. The user is not required to learn the benefits of the different types of flow forms available, but when given the option to use them, their judgement on which one to use may be changed, and potentially improved, so that the final product generated by a user is better. When a user selects a particular form flow, in any suitable, they might see a screen similar to FIGS. 13 and 14 which shows a form flow diagram and the form item in the form flow diagram. They may be provided an option to proceed with that particular form flow, or to view another. The user may be given an opportunity to further customize a flow form at this point and save it so that it is added to the form flow storage as depicted in FIG. 15.

In a different view of it, a grid view, by a right click a user may be provided a form flow. Here two different form items 20 and 22 are shown on a grid that can be expanded. When an item of the grid 20 is expanded, two optional form flows are visible, similar to the list view. For the form item 22, there are three form flows.

Figure 7B:
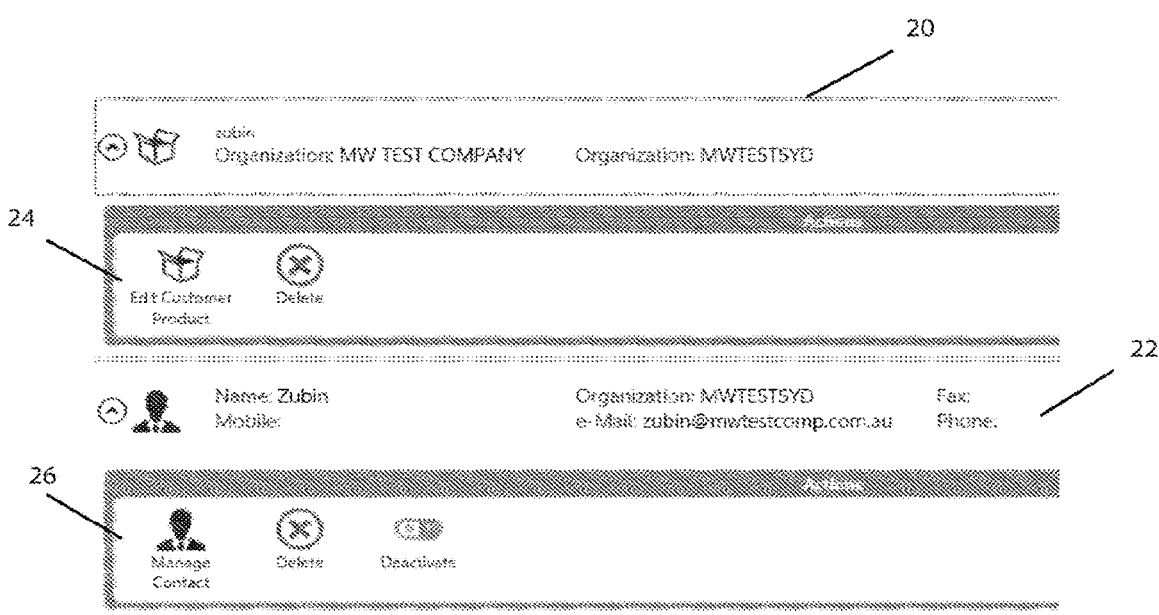
Figure 7C:
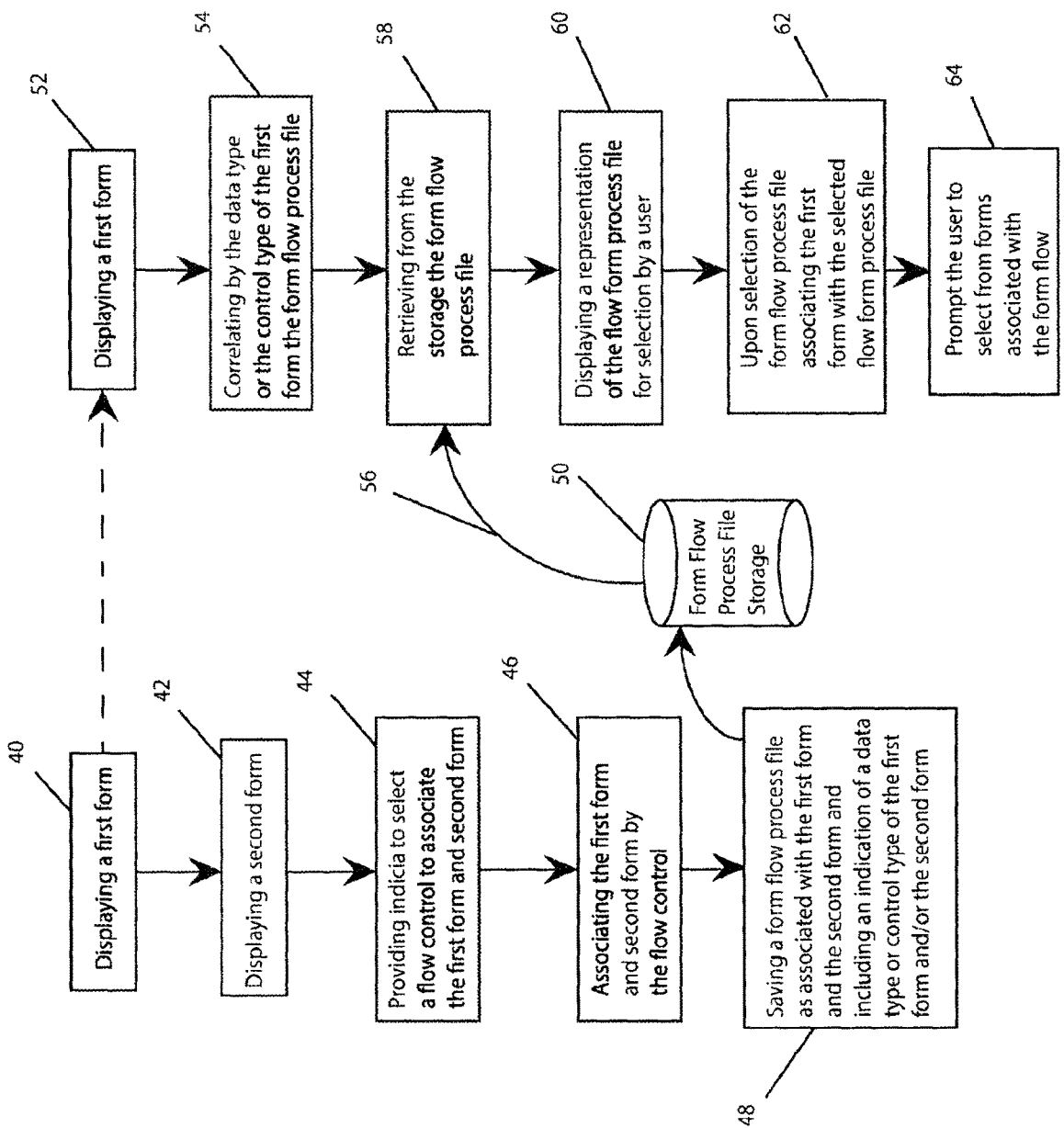
FIG. 7C depicts a flow chart of generating a form flow process file, storing it, and then reusing it in accordance with the disclosed methods and systems.

FIG. 7C depicts a flow chart of generating a form flow process file, storing it, and then reusing the form flow process file in accordance with the disclosed methods and systems. As discussed above, a first form 40 and a second form 42 can be displayed. A form flow process file can be formed by selecting 44 a flow form control indicium from, for example, a list of flow form control indicium, so that the first form and the second form are associated with the form flow control 46. The form flow process file can then be saved 48 in a form flow process file storage 50 as associated with the first form and the second form and including an indication of a data type or control type of the first form and/or the second form.

Still referring to FIG. 7C, the first form may be displayed 52 at a time different to when it was displayed 40. When a user wishes to apply a form flow to the form, form flows can be determined from the data type and/or the control type of the displayed first form 54. Those that include matching form items 56 may be retrieved 58 from the form flow process file storage 50. Certain ones may be not displayed by default settings. That is, in the case where the form flow is conditional, the form flow may be shown only if the record/form matches the condition. For example, assuming there are 5 jobs listed in a grid—3 AIR shipments and 2 SEA shipments. There could be 2 form-flows that show up for all 5 records, but then there could be certain form flows that only show up for the AIR shipments, and certain form flows that only show up for the SEA shipments.

Other form flows may be templates included with a product embodying the disclosed systems and methods. On a display screen may be shown one or more options for form flows as depicted by the examples of FIGS. 7A and 7B. Of course, any suitable rendering falls within the scope of this discussion including rendering an icon and form flow name. The method therefore includes displaying a representation of one or more process files for selection by the user 60. Upon selection of the form flow process file, the form is associated with the selected flow form process file 62. Optionally, the disclosed methods and systems can include prompting the user to select from forms associated with the form flow 64.

The system provides the ability to categorize form flow process files. In this way the disclosed methods and systems can utilize a search list that can nominate without code what data source should be used. A particular form flow can be built, but as mentioned it may also be tagged so that it does not appear on the search screen for a particular form item, even though the form item has the appropriate data type or execution code for that form flow. Form flows can also be presented in a certain order depending upon the form items to which they relate. Form flows can furthermore be conditional. For example, for an air shipment, a particular form flow may be used. If the form items is for a sea shipment, the condition may include, do not show that particular form flow. Therefore, when you right click, on one record or form items or another, you get another form flow. In this way, the disclosed systems and method provides the ability operate in a design everything environment rather than code everything approach. Because the form flow is linked to a type of data and/or execution code, the search screen is linked to a type of data and or execution code, therefore the link is available. With conditional flow form, form flows are available for particular types of shipments for these five conditions. Form flows for particular types of shipments can be set to appear when needed.

Description of the Underlying Methods and Systems:

The underlying disclosed systems and methods enable creating executable content and content flows without programming. For example, executable content can include interactive content. In one embodiment, content is forms, and content flows is form flows. In this disclosure, executable content will refer to executable forms. Nothing in this discussion is intended to limit content to forms however, the forms embodiment provide a ready illustration of the disclosed systems and methods.

The disclosed systems and methods enable the creation of executable form and form flows and, for example, can use the relationships between a central server, a designer device, and a user device to create, store, and transmit the created content and content flows in a lean computing environment. The created forms and form flows are useful in any environment, business lines, or systems in which a form is used. Generally, the disclosed systems and method provide visual layouts that represent form logic so users can visually or graphically create the form and form flow without needing to code computing language to create the form or form flow.

Logistics of transporting goods and freight is an example of an industry that requires many forms because is it a highly regulated global industry. When regulations change, forms and form flows often need to change. The disclosed example forms and forms flow systems and methods can function in a freight logistics environment. One of skill in the art will appreciate that the forms and form flows methods and systems disclosed here could be applied in any environment or system that uses or requires a form and even more broadly, the disclosed systems and method can apply anywhere that executable content and content flows are used.

Figure 7D:
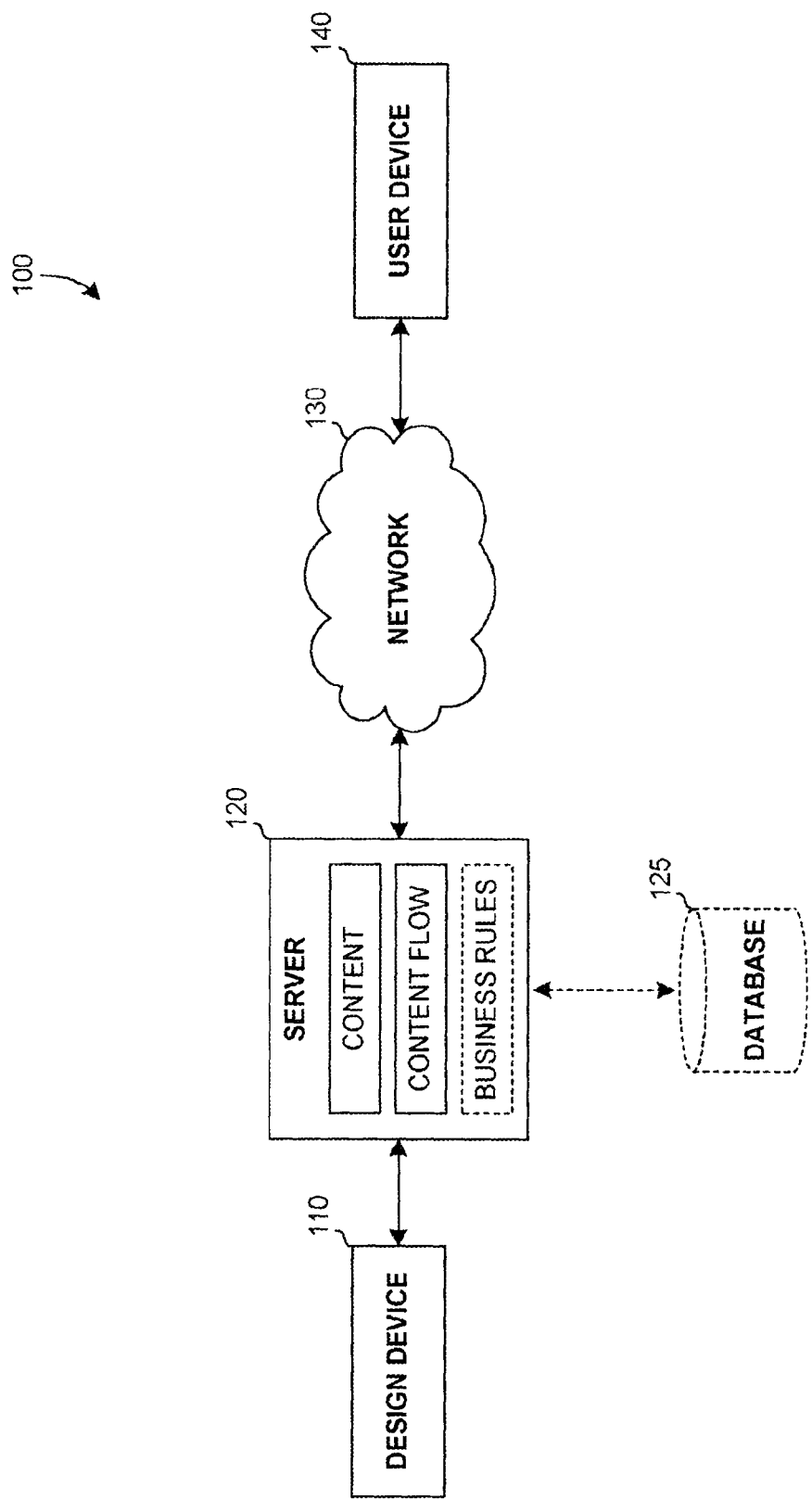
FIG. 7D is an example content and content flow system.

As mentioned, the described executable content can be of various types, including interactive content that can require user input, of which forms are a type of executable content. More particularly, this discussion will focus on executable forms as the executable content. FIG. 7D is an example of an executable form and form flow creation system 100. Forms can be designed on a design device 110 and stored on a server 120. Any other system configuration that provides the functionality to carry out the disclosed methods are within the scope of this discussion. The design device 110 is also used to create the form flow, which is also stored on the server 120. As mentioned, the form flow is the order in which various forms are accessed during a user device 140 requested process execution. The form flow is the logic underlying the display of form items to a user based on a user's interaction with the forms in the form flow.

Ultimately when the process of form and form flow creation is complete, during execution of the form flow on the user device 140, the form flow process file is retrieved from the server as required by the user. The forms of the form flow process are delivered as the forms are required during execution of the form flow process file on the user device. If server/network access is limited, forms can be stored on the user device 140. Both the forms and the form flow(s) can be stored on the same server 120 as shown in FIG. 7D, or alternatively, could be stored separately from one another as could be done in a distributed system such as a cloud-based computing system. Since the form and the form flows exist separately, there is not a requirement that the two be stored on the same server or system, although they may. Any type of user device is within the scope of this discussion.

As form flow determines a sequence, order and/or arrangement or other configuration of displayed related forms, form flow can be visualized as a flow chart. The form flow can include flow elements such as "if" conditions, switch conditions, while loops, jump/goto statements, decision statements, confirmation messages and other flow elements. The form flow defines a logical pathway by which one or more the related forms is accessed. Responses or rules regarding user inputs and interactions can be included in the form flow to be used to determine the subsequent content to retrieve and/or display. User input or interaction may not be required in the form flow in certain situations, such described above. The input and interaction can include the retrieval of information from a user device, a database, an intranet or the Internet. Such input can include, for example, GPS data or ambient sensor readings.

A design or designer device 110 can be used to create a form file and form flow process file which can be stored on a server 120 for use by a user device 140. Any other configuration of a design device is within the scope of this discussion. For example, a design device can be more than one device, for example, where multiple parties are contributing to the content of content flow.

Figure 8:
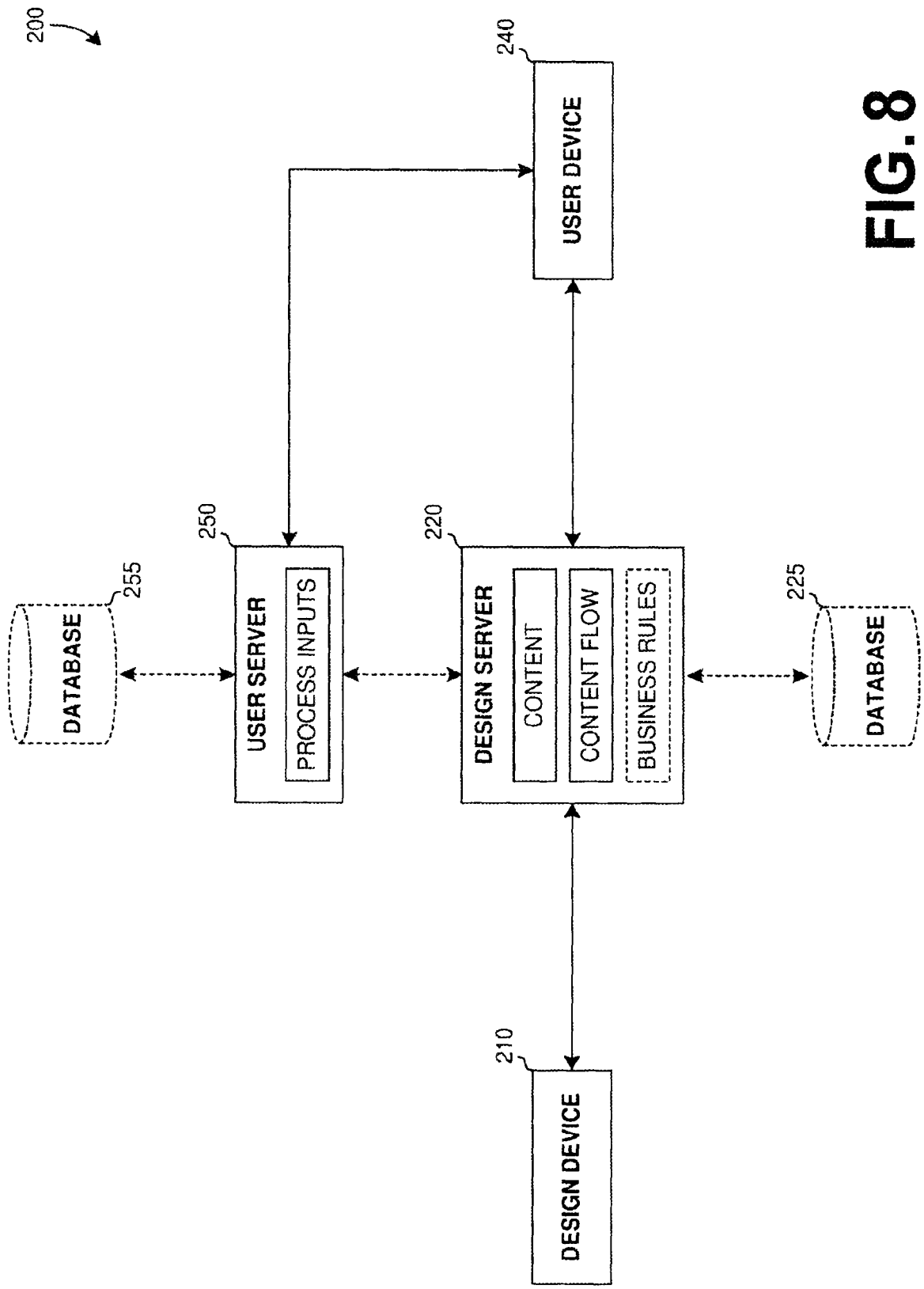
FIG. 8 is another example content and content flow system.

FIG. 8 is another example form and form flow system 200. In this example, the user process inputs can be transmitted by the user device 240 to a user server 250. The user server 250 can communicate with a database 255 where the process inputs can be stored and/or other information is stored. Process inputs would include the data that is inserted into a field, pulled or pushed. For example, were the field for "Booking Party" the process input could be "Joe's BBQ" (see FIG. 10, item 421). If the field were for "Transport Company" the process input could be "Frank's Freight". The user server 250 can receive the process inputs and compare or process them using information or tools stored on the connected database 255.

To illustrate the many system variations, FIG. 8 shows the design server 220 and the optional database 225 which can be similar in nature and function to the server 120 and database 125 of FIG. 7. In the example shown in FIG. 8, the user device transmits content inputs to a user server 250, so the design server 220 can function as purely a design server, containing the content, content flow, business rules and other content related items the user device may require to complete a selected task.

In the form and form flow system 200 of FIG. 8, the design device 210 is used to create form and form flows which are stored on a design server 220. The user device 240 can request a process from the design server 220 and will receive form and form flow. The design server 220 can also include business rules. A database 225 can also communicate with the design server 220. The database 225 can include other executable content, business rules or other information. The various elements of the form and form flow system 200 of FIG. 8 or any other system configuration can communicate between each other using network or other electronic communication protocols or methods.

Figure 9:
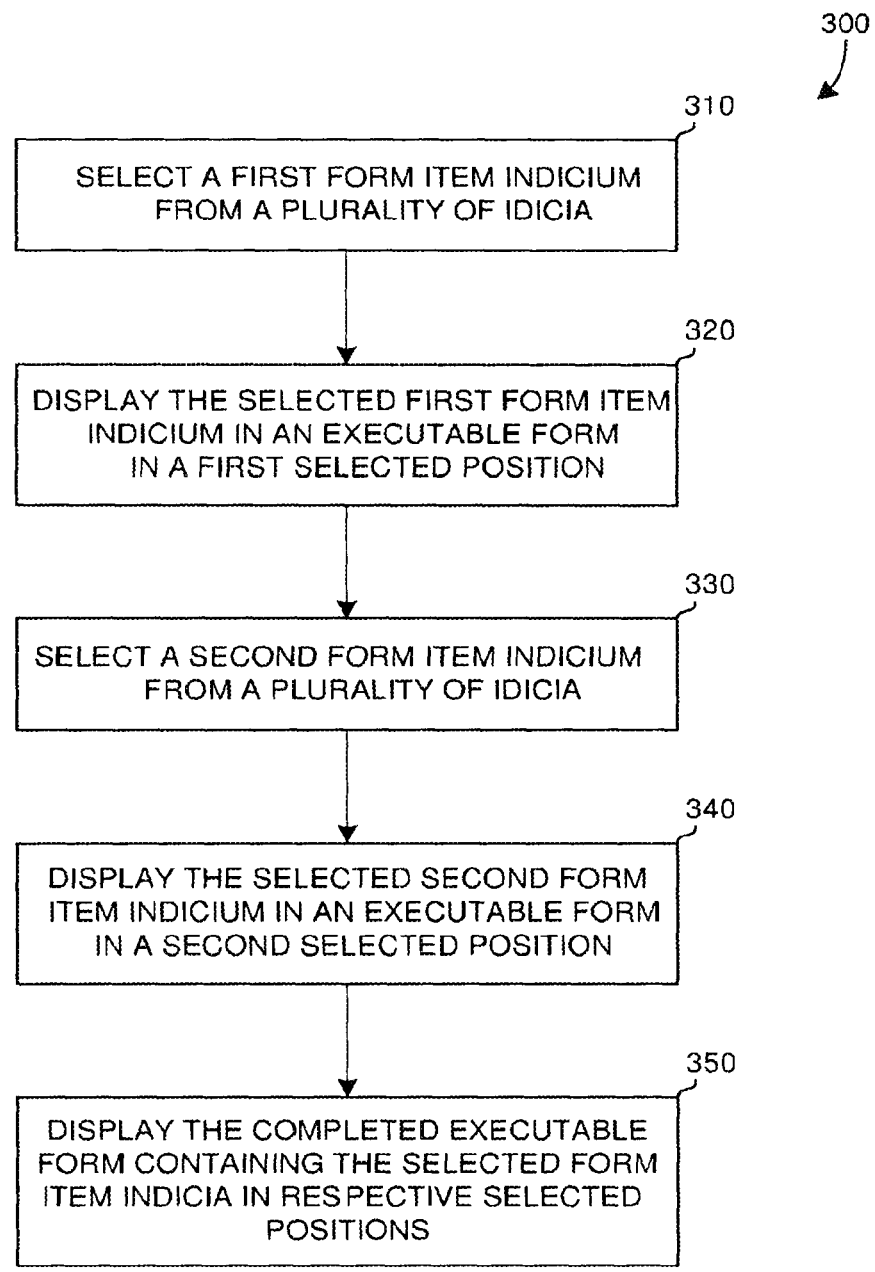
FIG. 9 is an example form creation process.

FIG. 9 depicts a form creation process 300. A form designer selects a first form indicium from a provided list, or plurality, of form indicia 310. A form indicium (pl. indicia) can be a form element, such as an input box or other interactive content. The first form indicium is placed and positioned by the designer 320 in the form view 420 (see FIG. 10) of the designer device or other suitable system. For example, the indicium is dragged from a list into the form view. When, for example the indicium is clicked, dragged or placed, the system inserts a code making the form item executable in the form. Other actions other than clicking, dragging or placing may cause the code to be linked or bound to the selected form item. Selection can be accomplished in any suitable manner. Any action so that an execution code can be added to a form item causing it to be executable where it previously was not are within this scope of this discussion. Selection is a convenient manner in which to discuss this feature. It is understood that any manner to cause a previously unexecutable form item to become executable within the spirit of this discussion is within the scope of this discussion.

Any other manner of positioning form items for inclusion in a form is within the scope of this discussion, particularly those utilized in a user graphical interface. The click and drag method described here is a common user interface method. A second form indium can be selected 330 and placed and positioned within the form view 420. The process of selecting and placing a form indicium can be repeated until the desired indicia are included within the form view 420. Once the form in the form view is complete 350, the designer can view the completed form and the various indicia and their positions within the form view 420.

Figure 10:
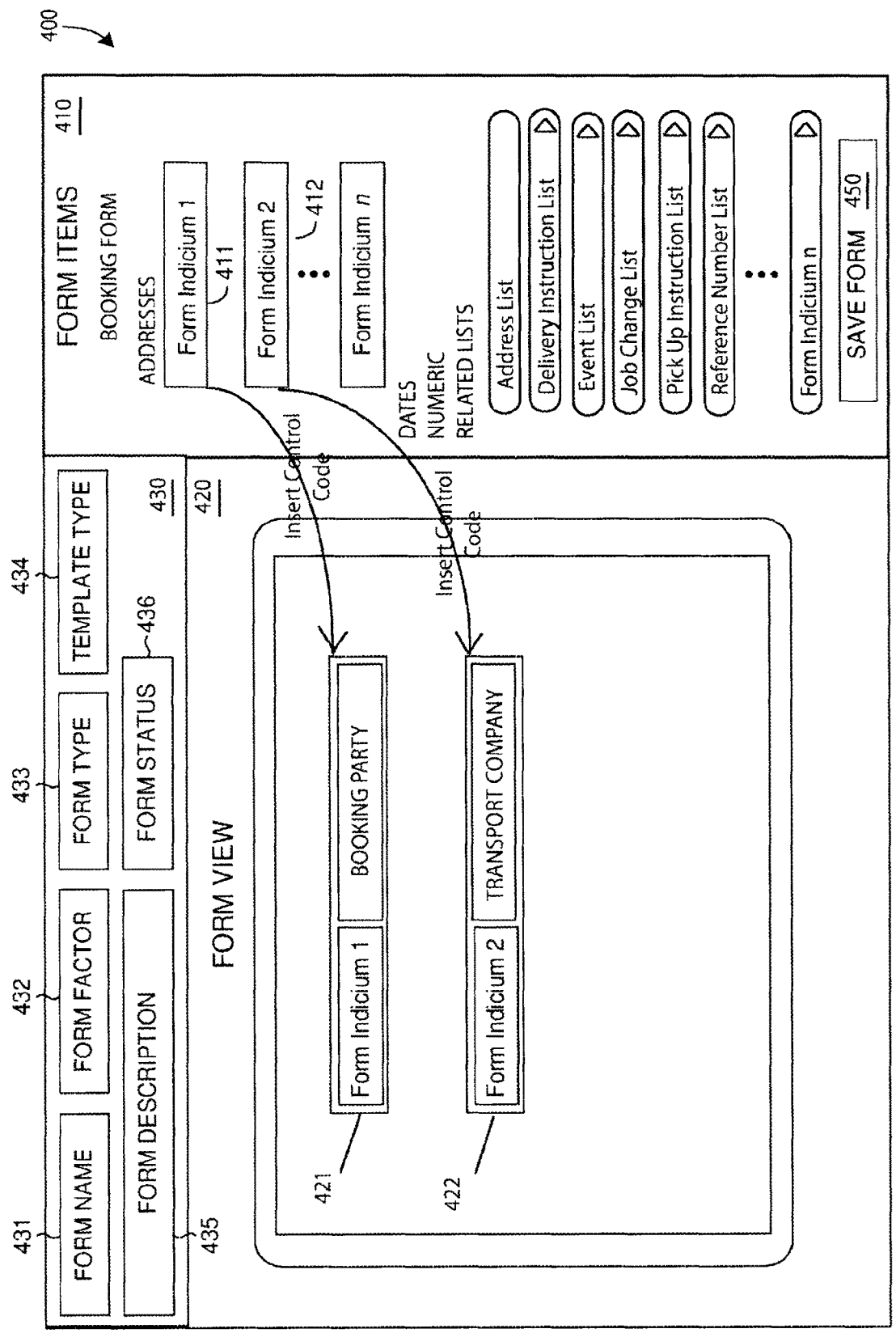
FIG. 10 is an example form creation interface where control code is inserted.
Figure 11:
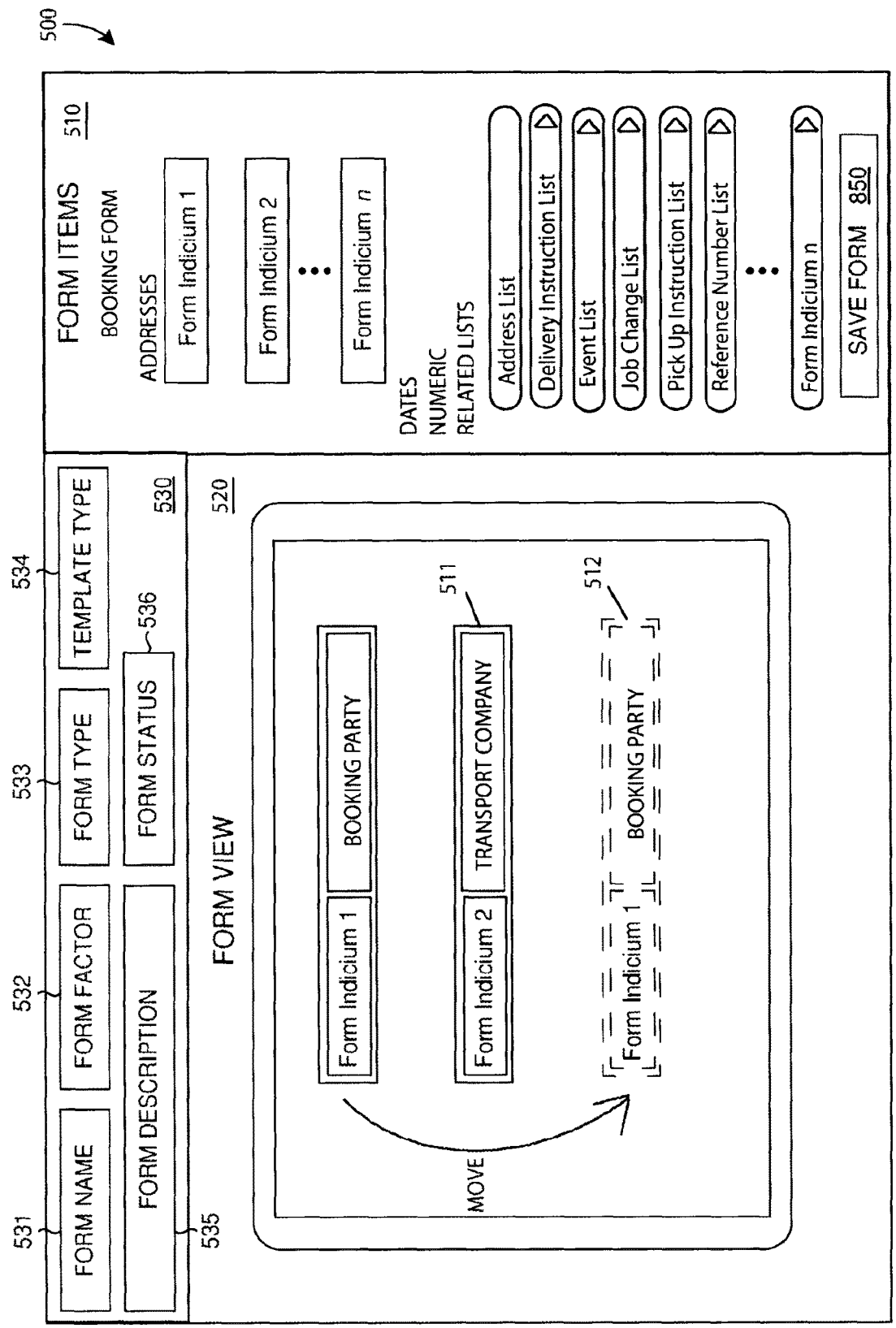
FIG. 11 is an example form creation interface utilizing form creation features.

Now referring to FIG. 10, when the user clicks, drags or places a field from the form item list 410 onto a form view 420, the system will do thing things: (1) the system will determine what type of control to drop onto the form view 420 by using the mapping table below; and (2) the system will insert XAML for that specific control into the form's XAML that specifies a) the type of control and b) the field that is being inserted/dragged into the form (city, state, postcode etc.). Upon completion of the form, the XAML is serialized. Serializing means converting what is dragged onto the form view 420 (see FIG. 4) into a structure that can be stored in the database as text (XAML). Deserializing means reading that XAML from the database and reconstructing the form either for further designer modifications, or for preparation for execution.

| Mapping Table | |
|---|---|
| Data Type | Type of Control |
| String | Text box |
| String with list of choices | Dropdown |
| Date | Date picker |
| Time/Duration | Time picker |
| Boolean | Checkbox or Option button |
| | (in cases like this, the user has a choice) |
| Collection | Grid |
| Related entity | Search box |

As background, eXtensible Application Markup Language (XAML) is an XML based language used for defining user interfaces. Any other such language is within the scope of this discussion. Accordingly, when a form rendering engine reads the serialized form XAML it can determine how to interpret the executable form items to produce a form that can be executed. Below, this process and how to achieve it is explained. In this way, a user without concern about how the form item will function, in a single repeatable step, can build a form.

FIG. 10 depicts that as the disclosed systems and methods allow a user to drag fields from the form list 410 onto a form which is being created on the form view 420, the disclosed systems and methods will insert XAML that represents the relevant control into the form of a specific type which are 'linked' or bound to the dragged field. That is, the system recognize the data type and in the form view 420, inserts a control. Such a field is for example form indicium 1 and form indicium 2. When the user saves the form 450, serialization of all the controls into a single block of XAML will occur, and this block of XAML is saved to the database.

Converting what is dragged onto the form view 420 into a structure that can be stored in the database as text (XAML) requires creating a set of XAML extensions to control certain configurable options including, but not limited to, what caption to show for a field, whether it should be read only or allow input, whether a control that accepts the entry of an address should or should not show a 'country' field etc.

In this way, a user in one step arranges executable form items to generate an executable form. Due to 2(b) above (the field that is being inserted/dragged into the form (city, state, postcode etc.), the system determines what data to load from the data storage as forms in which users enter inputs or data that is captured and used elsewhere within the system, or what data to push to the data storage when the user enters it. Executable form items may not require user interaction. Rather, they can retrieve an input based on data stored or generated within a user device, such as a time stamp, a location or other user device data.

Another feature depicted in FIG. 10 refers to form factors. The form factor field 432 can be a list of selectable form factors which determine the user device display size, resolution and other parameters. The form factors define the area in which the designer can design the created form. Shown in FIG. 10 is a tablet form factor, however during the form building process, the form factor on the form view 420 can be changed to another form factor. Other form factors include a smartphone, computer screen or other common user device types. Selected form factors 432 can be used to determine the form view 420. Changing form factors can be achieved by a "form service" that provides conversion to the rendering in the required language—either in XAML, HTML or JSON (or whichever rendering language is utilised by a "native" device having particular form factor). In particular, creating a set of XAML extension for rendering on each device type can require ensuring that the form look nearly identical when it was run compared to when it was 'designed'. As mentioned, in the form view 420, the form factor can be changed.

To provide a one-step solution for a user to create an executable form file and a form flow process file that would operate on different native platforms involves creating the mapping of data type to control type, and making the controls intelligent enough to understand those data types and the slight differences between them, creating the ability to have snippets for each control type in three languages, allowing multiple options on each control type (such as Width, Height, ReadOnly, Caption, TextWrapping, etc.)—and making these options work across all three languages in a near-identical way, and ensuring a near-identical user experience for each of the three language versions of each snippet. Making the controls intelligent enough to understand the data types when they are clicked, dragged or dropped onto the form view involves creating a snipper per control, per language. Each snippet then has a series of 'placeholders' within it, such as—Width—, —Height—etc. There is code behind each of the snippets, for each language, that dictate how each of those options is interpreted by the relevant language and platform.

Creating such a conversion set would require substantial careful work by a large team of programmers and then carrying out this large project required careful planning, exceptional productivity management and constant testing.

For each device, there is a form rendering engine. This engine knows how to render the form for the specific device. It either renders from XAML, HTML or JSON. First the client device requests the form from the form service. The form service converts the designed and stored XAML into the required language—either XAML, HTML or JSON. For each 'type of control' (textbox, date picker etc) there is a snippet of code that defines that control in each language—i.e. XAML, HTML and JSON. For example, when converting a XAML form to JSON, for example, each XAML control is replaced with the JSON equivalent. The result can be that a JSON form that looks nearly identical to the original designed XAML form.

Figure 12:
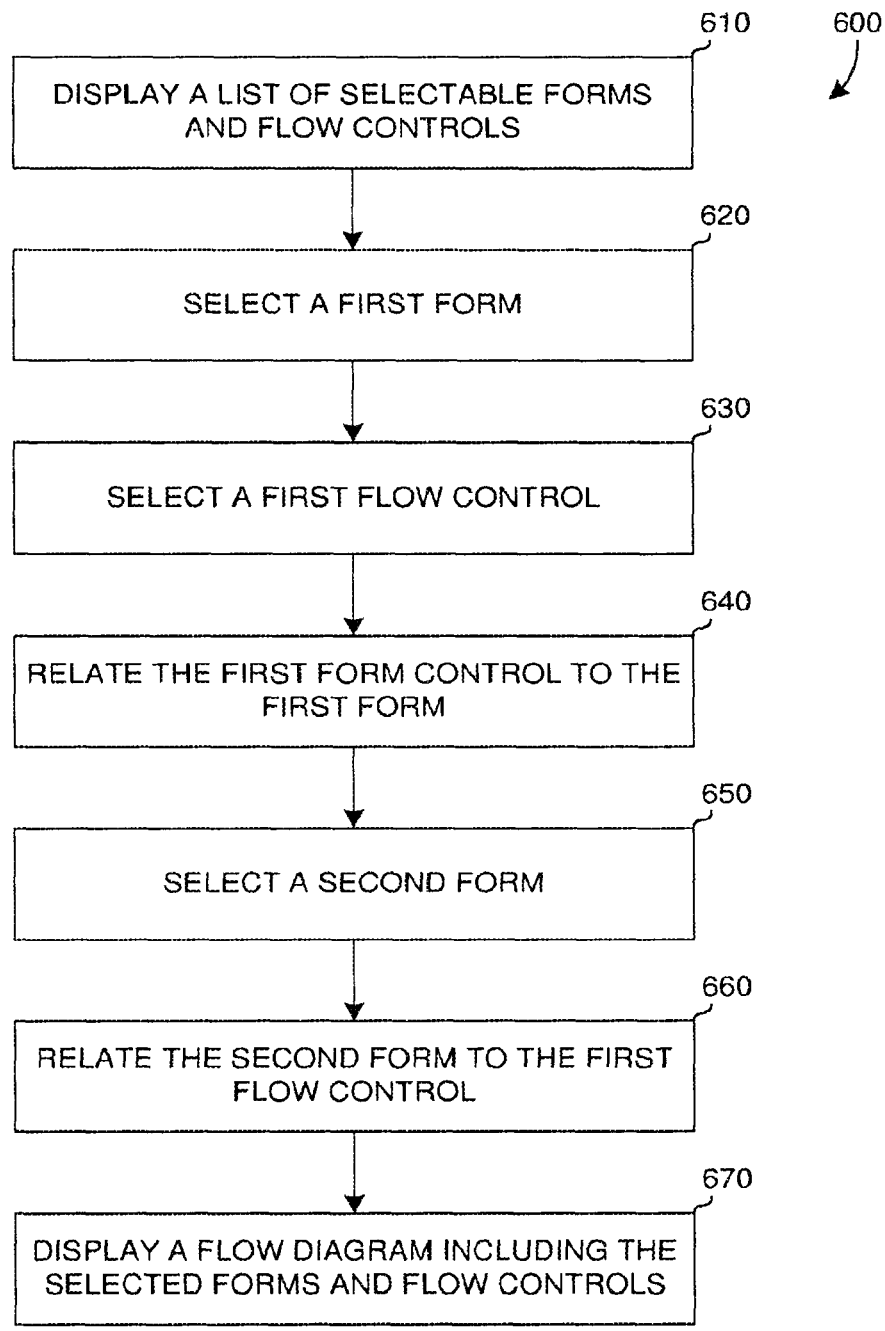
FIG. 12 is an example form creation process.

FIG. 12 depicts a process of the described form flow designer systems and methods. A list of selectable executable forms and flow controls are displayed 610 and a first form is selected from the list of forms 620. A first flow control is selected 630 and related to the first form 640. A second form can then be selected 650 and related to the first flow control 660. The completed form flow is displayed, showing the various selected forms and flow controls 670. When saved, the form flow is serialized and stored using XAML (however is not limited to XAML).

Figure 13:
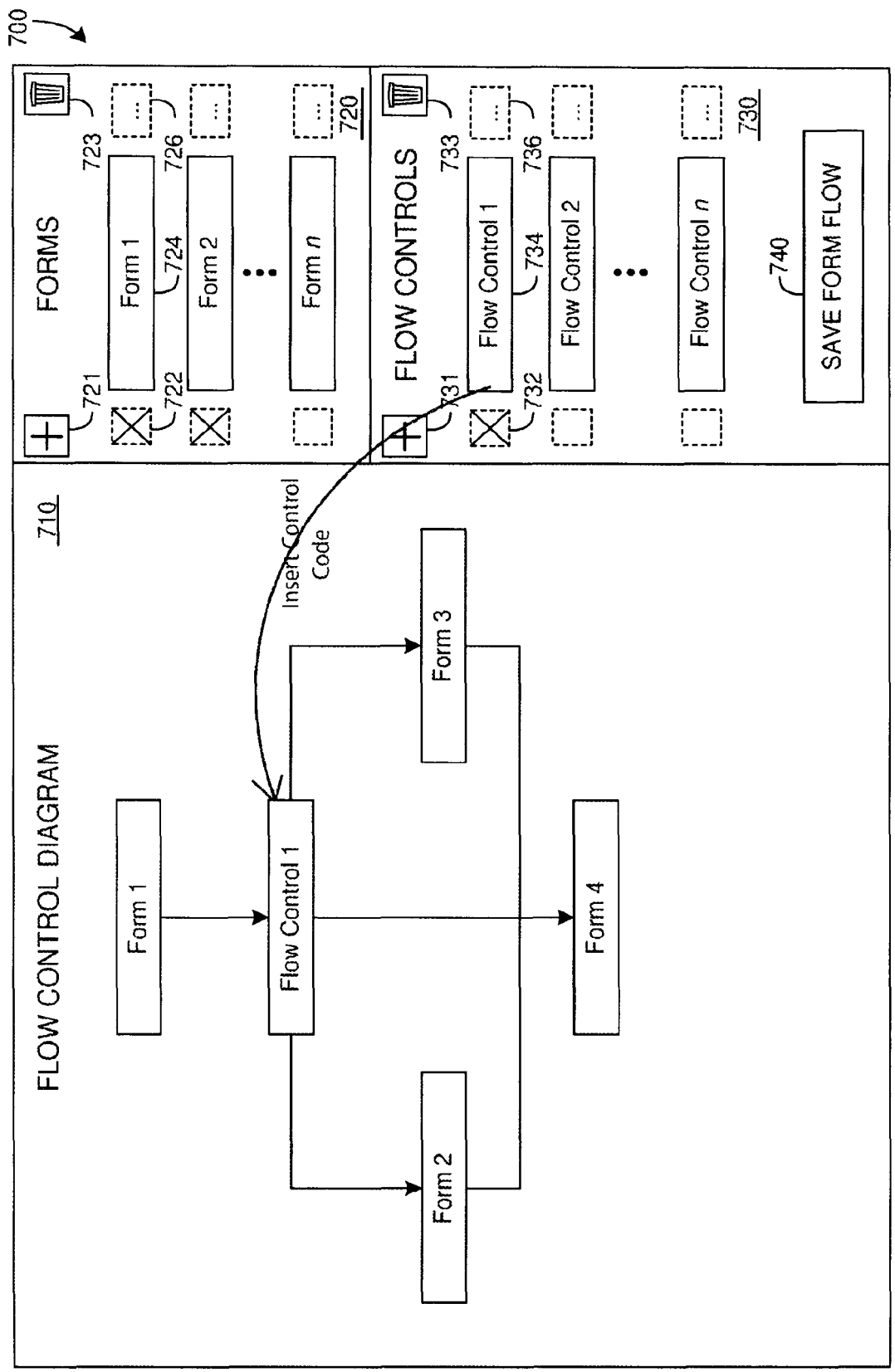
FIG. 13 is an example form flow creation interface.

FIG. 13 depicts a form flow designer. The form flow determines a sequence, order and/or arrangement or other configuration of a plurality of forms. The form flow can include flow elements such as "if" conditions, switch conditions, while loops, jump/goto statements, decision statements, confirmation messages and other flow elements. In an example flow, the form flow can function as logic statements that link various forms together in a variety of pathways and a user experiencing a singular pathway based on their interaction with the forms. In an example form flow, the form flow controls can function as logic statements that link various forms together in a variety of pathways, with a user experiencing a singular pathway based on their interaction with the forms. The form flow can result in non-singular flows as well where the user is given multiple choices.

The form flow process file does not contain the related form files. When requesting a process, the user device receives a form flow process file for that process. The form flow process triggers the user device to request or retrieve selected forms based on the user's interaction with at least a previous form. If the user has limited server access, the form file can be stored on the user's device.

FIG. 13 shows that forms can be positioned on the graphical user interface. Just like with the form view interface, the forms in the flow designer can be moved into any order, copy and pasted, etc. The flow controls can be positioned between the forms, and can be moved to a different position as well. That is, when a flow control such as 734 is clicked, dragged or placed in the form flow designer user interface, code is inserted into the form flow. Edits can be made to the form flow since when the form flow process file is saved, the XAML code is serialized. Again, if changes after saving are desired, the XAML code will be deserialized and then later serialized.

Figure 14:
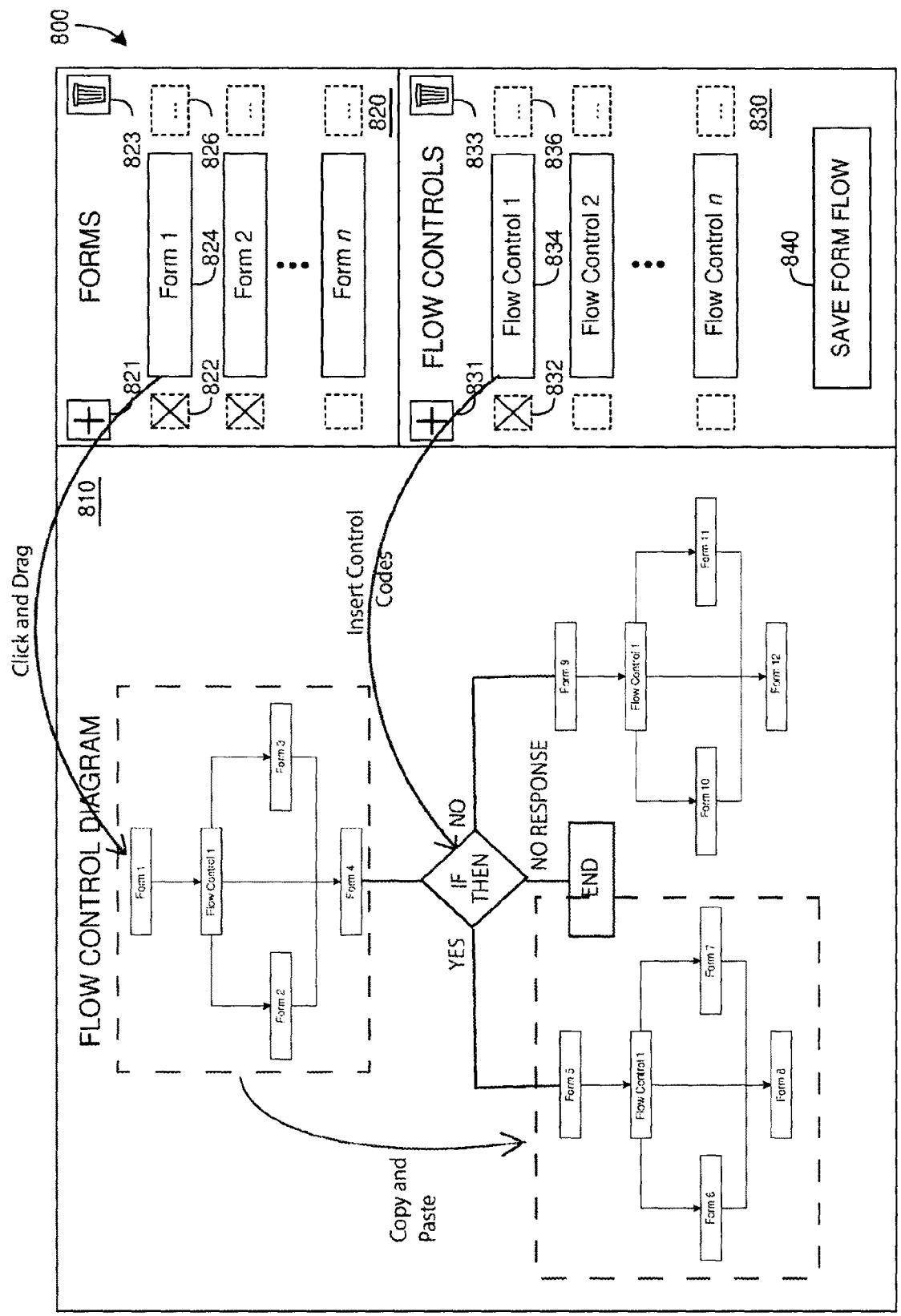
FIG. 14 is an example form flow creation process using the form flow creation features.
Figure 15:
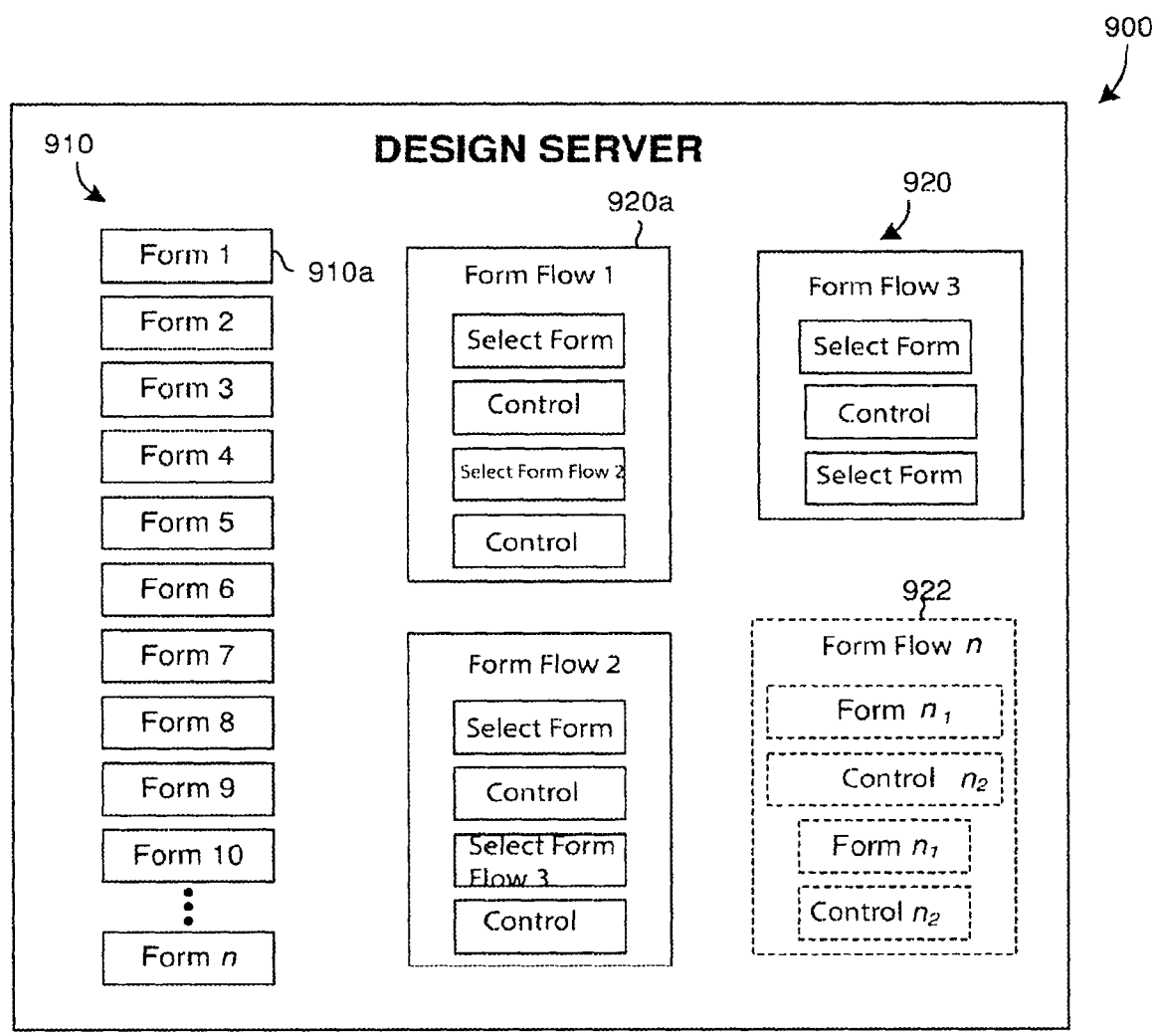
FIG. 15 is an example design server including example forms and form processes.

FIG. 14 is an example form flow creation process 800. A list of selectable forms and flow controls are displayed 810 and a first form is selected from the list of forms 820. A first flow control is selected 830 and related to the first form 840. A second form can then be selected 850 and related to the first flow control 860. The completed form flow is displayed, showing the various selected forms and flow controls 870.

Flow controls 834 are displayed in the flow controls window 830 and on the flow control diagram 810. The flow controls 834 are linked to associated forms as shown within the diagram 810. When the flow controls 834 are dragged to the flow form viewer, the flow controls are invoked which means that the form flow is executable. Similar to forms, when a user drags forms onto the form-flow designer, or flow elements (IF, WHILE, LOOP, JUMP, GOTO, etc.) these will be stored as serialized XAML in the form flow definition. The system will read the serialized form flow XAML and determine how to interpret each element in the form flow, and produce an executable system that follows the designed form-flow. As the form flow is executed, the form flow can call forms when certain form items are executed. Once the form flow is complete with the forms 824 and flow controls 834, the form flow can be saved or published to a server or other network location using the save form flow button 840.

FIG. 15 is an example design server 900 that includes forms 910 and form flows 920. Business rules 930 can optionally be stored on the design server 900. As noted in FIGS. 1 and 2, the system configuration can include a plurality of remote servers. As discussed above, the forms files 910 and the form flow process files 920 are stored separately from another within the server 900 as the flow form process files access the form files. Form flow 1 can select one or more forms from forms 910 and can select a different form flow, such as form flow 2. Various form flows can utilize the same forms. Form flow n is depicted to show that any form can be utilized within a form flow and control codes of the serialized XAML code link the forms so that the user can experience a seamless interaction with the forms.

Figure 16:
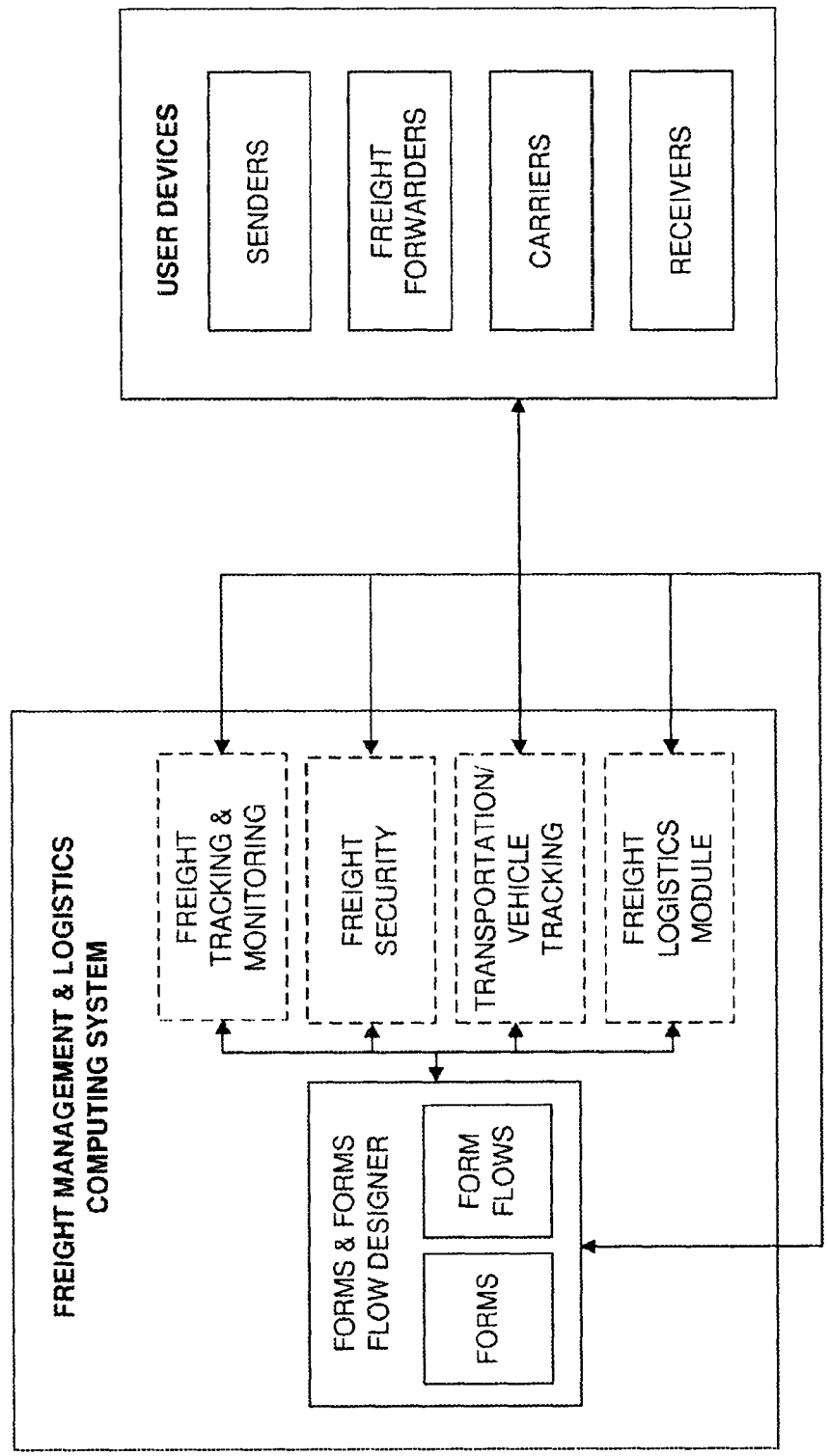
FIG. 16 is a use example of the disclosed systems and methods.

Referring to FIG. 16, many logistics systems, such as the proprietary WiseTech Global CargoWise One™ system, use a large number of forms to properly document and route cargo. Due to the international nature of the majority of cargo shipping, the forms can require frequent updates. Further, the integration of a logistics system with existing legacy systems can require unique customization of the logistics system for each customer. The use of the above described form creation and form control creation tools within a logistics system can allow customers or system suppliers to quickly and efficiently create and edit forms in response to regulatory changes. Further, the customizability of the forms and form controls can assist in the integration with existing or other customer systems. Customers can use the system supplied tool to create their own customized forms and flows.

Freight forwarding is one industry that utilises forms. There are many others including insurance and banking. A freight management module can include at least one of a freight tracking and monitoring module, a freight security module, a transportation and vehicle tracking module, and a freight logistics module. An executable form can relate to an aspect of a freight shipment and each form flow process file can relates to an aspect of freight management of the freight shipment. Form can be for example, a customs declaration form associated with a particular jurisdiction. A user device can be associated with at least one of a freight sender, a freight forwarder, a freight carrier, and a freight receiver. A forms database and the form flow process file database can each be configured to be accessible by multiple user devices including sender devices, freight forwarder devices, carrier devices, and receiver devices. Any user device is within the scope of this discussion.

The disclosed freight management system can include a freight forms database configured to store multiple executable freight forms each relating to an aspect of one or more freight shipments, each of the stored executable freight forms including one or more freight form items indicia selected by a user from multiple executable freight form items indicia representative of corresponding freight form items, the multiple executable freight form items indicia each displayed on a user device. The disclosed freight management system can also include a freight form flow process database configured to store multiple freight form flow processes, each of the stored freight form flow processes including respective freight form flow control that each invoke a selected freight flow control associated with one or more of the freight forms stored in the freight forms database. The disclosed freight management system can also include a freight management module configured, upon receiving a request from the user device, to receive at least one of the freight forms and the freight form flow processes and to transmit the received at least one of the freight forms and the freight form flow processes to the user device.

The disclosed freight management system can include a freight form database configured to store multiple executable freight forms, each of the stored executable freight forms including one or more freight form items indicia selected by a user from multiple freight form items indicia representative of corresponding freight form items, the stored freight forms each being executable and created based on instructions received from the user that include a selection of the one or more freight form items indicia. The disclosed freight management system can also include a freight form flow process database configured to store multiple freight form flow processes, each of the stored freight form flow processes including respective freight form flow control that when invoked provide a selected freight flow control associated with one or more of the freight forms stored in the freight forms database. Additionally it can include a freight tracking and monitoring module configured to access one or both of the freight forms database and the freight form flow process database, the freight tracking and monitoring module further configured to store and process data related to a first freight shipment, the freight shipment associated with one or both of a first freight form stored in the freight forms database and a first freight form flow process stored in the freight form flow process database, the freight tracking and monitoring module further configured to retrieve the first freight form from the freight forms database and the first freight form flow process from the freight form flow database.

A disclosed freight management system can include a freight form database configured to store multiple executable freight forms, each of the stored executable freight forms including one or more freight form items indicia selected by a user from multiple freight form items indicia representative of corresponding freight form items, the stored freight forms each being executable and created based on instructions received from the user that include a selection of the one or more freight form items indicia. It can also include a freight form flow process file database configured to store multiple freight form flow processes, each of the stored freight form flow processes including respective freight form flow control that when invoked provide a selected freight flow control associated with one or more of the freight forms stored in the freight forms database. Furthermore, a disclosed freight management system can include a freight tracking and monitoring module configured to access one or both of the freight forms database and the freight form flow process file database, the freight tracking and monitoring module further configured to store and process data related to a first freight shipment, the freight shipment associated with one or both of a first freight form stored in the freight forms database and a first freight form flow process file stored in the freight form flow process file database, the freight tracking and monitoring module further configured to retrieve the first freight form flow process file from the freight form flow database and the first freight form from the freight forms database. The request for the form flow process file and/or a form file can include an indication of the user device form factor. The request for a form flow process file and/or a form file can include an indication of the user device's native device rendering language.

Disclosed are methods and systems that allows a user to access indicia representing executable form items, click and drag them into a space on a display screen, and build a form of executable form items. The disclosed methods and systems allow the executable form items to be arranged and rearranged as the user is building the form. The form as it is being built on a display is executable as execution codes are attached the form items when the indicia is dragged onto a form view screen. The form can then become part of a form flow, that is a flow chart, that indicates controls such as 'if', 'then', 'else if', 'goto', 'jump', 'while'. Because the form items become executable when displayed in, for example, a form viewer, a user will not need to consider how to define the manner in which the form items function. That is a user, in a single step, will select a form item that is a particular type to the build the form, and this form will immediately be executable.

Disclosed are methods and systems for enabling customizable executable content and customizable executable content flows. More specifically, disclosed are methods and systems for enabling customizable forms, such as executable forms, and form flows, such as form flows that include executable forms. More particularly, methods of creating executable forms are disclosed in which form indicia representing of a plurality of executable form items are provided on a display screen. The form items are represented by indicia. Instructions are received to select a first form indicium from the form indicia and the first form indicium is selected. The selected first form indicium is then displayed and further instructions are received to select a second form indicium of the form indicia. The second form indicium is selected. The selected first form indicium and the second form indicium are displayed in a particular order as an executable form that has executable form items.

In an example, the executable form items are then executed. In still further examples, the receiving the instruction to select a first indicium and a second indicium can be done via a latching device that can latch onto the indicia on a screen of the display and move the indicia to another location on the display screen or another display screen. Further, some example methods also change the particular order of the selected first indicium and the selected second indicium so that the executable form items are in another particular order. In some of the examples, the indicia representative of the plurality of executable form items on a display screen are divided into categories of executable form items.

Also disclosed are methods of creating executable forms in which form indicia representative of a plurality of executable form items are provided on a display screen and instructions to select a first indicium of the form indicia are received. The first form indicium is selected and the selected first form indicium is displayed. Instructions are received to select a second form indicium of the form indicia and the second form indicium is selected. The selected second form indicium with the selected first form indicium is displayed in a particular order as a first executable form that has executable form items. These steps are repeated to generate a second executable form, and optionally additional executable forms, and the second executable form is also displayed.

Disclosed are also methods of creating a form flow process based on the forms, and in some examples the executable forms, discussed above. Flow indicia representative of flow controls are provided on the display screen or any other display screen. Instructions are received to select a first flow indicium of the flow indicia. The first flow indicium when positioned on a form flow viewer or display invokes a selected flow control. Instructions are received for arranging one or both of a first executable form and a second executable form in conjunction with the invoked selected flow control on the display screen or another display screen. A form flow diagram is displayed on the display screen or another display screen. The form flow diagram includes the first executable form and the second executable form in conjunction with the invoked selected flow control.

Also disclosed are methods of creating customizable forms that include transmitting from a server to a designer device multiple form items indicia. The server receives first instructions from the designer device. The first instructions include a selection of at least one of the multiple form items indicia. An executable form is generated that includes the selected at least one of the multiple form items indicia as form items. The executable form can be stored in a form database, in some examples. The executable form can be sent to one or both of the designer device and a user device. In some examples, the instructions include a selection of at least two of the multiple executable form items indicia and the server receives second instructions from the designer device. The second instructions include an order of the selected at least two of the multiple executable form items. In some examples, the first instructions and the second instructions are simultaneously sent as a combined instruction to the server. The server can also receive third instructions from the designer device. The third instructions could include a revision, addition, and/or deletion of at least one of the selection of the at least two of the multiple executable form items and the order of the selected at least two of the multiple executable form items.

In some of the example methods of creating customizable forms, more than one customizable form is created. The multiple customizable forms can be stored in a forms database. Corresponding systems with system components that function in the same way as the described methods are also disclosed.

Still other example methods of creating customizable forms are disclosed. These methods include a designer device sending a request to create a customizable form to a server and receiving, from the server, a data message that includes multiple form items indicia. The multiple form items indicia are displayed on a display of the designer device. The designer device receives first user input that includes a selection of at least one of the multiple form items indicia. A data message that includes the selected at least one of the multiple form items indicia is transmitted to the server. An executable form is received that includes the executable code of each of the selected at least one of the multiple form items indicia. In some examples, the received executable form is displayed on the display of the designed device. Still further, in some examples the displaying on the display of the designer device the multiple form items indicia includes displaying groups of the multiple form items indicia categorized by type of form items indicia. The received executable form can be executed on the designer device in some example methods.

The designer device can, in some examples, receive second user input that includes a revision, addition, and/or deletion of the selection of the multiple form items on the display or form viewer. The first user input includes selection of at least two multiple executable form items and second user input can be received at the designer device, in some examples. The second user input includes a revision, addition, and/or deletion of at least one of the selection of the multiple executable form items and an order of the selection of the multiple executable form items. As with the other examples above, the disclosed methods of creating the customizable form can be repeated to create multiple executable forms.

Still additional methods of creating customizable forms are disclosed. A server transmits multiple form items indicia to a designer device. Each of the multiple form items indicia represent corresponding executable form items. The server receives first instructions from the designer device that include a selection of at least one of the multiple form items indicia. An executable form is generated that includes the form items corresponding to each of the selected at least one of the multiple executable form items indicia.

Systems for creating customizable forms are also disclosed and include form items indicia database, a server, and a processor. The form items indicia database is configured to store multiple form items indicia each representative of corresponding executable form items. The server is configured to transmit at least some portion of the multiple form items indicia to a designer device and is further configured to receive first instructions from the designer device that include a selection of at least one of the multiple form items indicia. The processor is configured to generate an executable form that includes the executable form items of each of the selected at least one of the multiple form items indicia. The server can be configured, in some examples, to transmit the at least some portion of the multiple form items after receiving a request for the at least some portion of the multiple form items from the designer device.

In the example systems in which the instruction includes the selection of at least two multiple form items indicia the server can be configured to receive second instructions from the designer device that includes a revision, addition, and/or deletion of at least one of the selection of the at least two of the multiple form items indicia and the order of the selected at least two of the multiple executable form items on the form viewer. The server can be configured to transmit the executable form to the designer device and in further examples can transmit the executable form to the design device after receiving a request for the executable form from the designer device.

Also disclosed are systems in which the executable form is a first executable form and the server is further configured to receive second instructions from the designer device. The second instructions include a second selection of at least one of the multiple form items indicia. The processor is further configured to generate a second executable form that includes the executable controls relating to of each of the selected at least one of the multiple form items indicia for the second executable form. The system can also include an executable forms database that is configured to store the generated executable form. Still further, upon receiving a request from the designer device for the generated executable form, the server can be further configured to transmit the generated executable form to the designer device. The system can also include an executable forms database that is configured to store the first executable form and the second executable form. In still further examples, upon receiving a request from the designer device for the one or both of the first executable form and the second executable form, the server is further configured to transmit the one or both of the generated first executable form and the second executable form.

Also disclosed are methods for creating form flow processes. A first form and a second form are displayed on a display and flow indicia of flow controls are also provided on the display. Instructions are received to select a first flow control indicium of the flow indicia and to display the first form and the second form. The selected flow control is invoked in conjunction with the displayed first form and the displayed second form. A first form flow diagram is displayed on the display screen or another display. The first form flow diagram includes an arrangement of the first form and the second form in conjunction with the invoked selected flow control. In further examples, instructions can be received to rearrange at least one of a first form and a second form in conjunction with a selected flow control on the display screen and a second form flow diagram can be displayed on the display screen or any other display screen. The second form flow diagram can include the first executable form and the second executable form. Any of these forms in the form flow creation process can be executable.

Disclosed are methods for creating form flow processes that include transmitting multiple flow indicia of flow controls related to at least one form and a graphical representation of at least one form to a designer device. Instructions from the designer device are received and include a selection of at least a first flow control indicium related to the at least one form. The first flow control indicium is invoked and related to the at least one form in conjunction with the at least one form to create a first form flow diagram that includes an arrangement of the at least one form and the at least the first flow control indicium. The first form flow diagram can be transmitted to the designer device. Upon receiving a request for the at least one form based on the first form flow diagram from the designer device, the at least one form can be transmitted to the designer device.

In some examples, the at least one form includes a first form and a second form and, upon receiving a first request for the first form based on the first form flow diagram, the first form is transmitted to the designer device. Upon receiving a second request for the second form based on the first form flow diagram, transmitting the second form to the designer device. As with the above examples, the forms can be executable forms.

Still additional methods of creating form flow processes are disclosed and include providing multiple flow indicia of flow controls and graphical representations of at least one form and receiving instructions that include a selection of one or more flow indicia of flow controls related to the at least one form. The received instructions are transmitted to a server and a form flow diagram is received based on the transmitted instructions. The form flow diagram includes an arrangement of the at least one form. In some examples, a request for the at least one form is transmitted based on the received form flow diagram. The multiple forms can include a first form and a second form. In some examples, one or more flow indicia of flow controls related to the first form and the second form are selected and the form flow diagram includes an arrangement of the first form and the second form.

A request for the first form is transmitted based on the form flow diagram. If desired, a request for the second form is also transmitted based on the form flow diagram. Any of these forms can be executable. The multiple flow indicia of flow controls and graphical representations of at least one form are displayed on a display of the designer device. The form flow diagram can also be displayed on a display of the designer device. Instructions are received to rearrange at least one of the one or more flow indicia of flow controls and the at least one form, in some examples, and can include one or more conditional if/then/else logic. Also disclosed are offline operations modes for the disclosed form flow processes. An offline message is transmitted and, in response to the transmission of the offline message, the form flow diagram is received along with each of the at least one forms related to the form flow diagram.

To summarize the underlying technology, disclosed are methods of creating a form flow process in which the instructions are transmitted from a designer device. A data message is transmitted that includes a form factor of the designer device to the server. The form factor can include a mobile form factor, a tablet form factor, and a desktop/laptop form factor. The form flow diagram can be received in a computing language that is compatible with the form factor of the designer device.

Other disclosed methods of using form flow processes include receiving a request from a user device at a server for a first form flow. The first form flow includes a process of first form flow controls. Each of the form flow controls is related to at least one form stored in a forms database. The first form flow is transmitted to the user device. The server receives a first request from the user device for a first form indicated in the first form flow control. The server also receives a data transmission from the user device that includes a form factor of the user device. The first form is transmitted to the user device in the form factor of the user device.

The disclosed methods of using form flow processes also can include receiving a second request from the user device for a second form indicated in the first form flow control and transmitting the second form to the user device. The second form is transmitted in a computing language that is compatible with the form factor of the user device. The first form flow can be stored in a form flows database and can be executable. The form factor can include a mobile form factor, a tablet form factor, and a desktop/laptop form factor. The first request and the data transmission are received simultaneously by the server, in some examples.

Also disclosed are systems of using a form flow process that have a server and a processor. The server is configured to receive a form factor data transmission from one of a designer device and a user device. The form factor data transmission can include a form factor associated with the one of the designer device and the user device. The server is also configured to receive requests from the designer device for multiple flow indicia of flow controls and graphical representations of at least one form from the multiple forms stored in the forms database and to receive instructions that include a selection of one or more flow indicia of flow controls related to the at least one form. Still further, the server is configured to transmit a form flow diagram based on the received instructions. The form flow diagram includes an arrangement of the at least one form based on the selected one or more flow indicia of flow controls. The processor is configured to invoke the selection of one or more flow indicia of the flow controls related to the at least one form in conjunction with the at least one form to create the first form flow diagram that includes an arrangement of the at least one form and the selected flow indicia.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

Example

In one example, the disclosed methods and systems are implemented as a platform that provides product managers and business analysts with a set of tools or building blocks that let them, ie non-technical people, build entire business products/applications. Further, they can build these products once, and deploy to multiple different software and hardware platforms, including iOS, Android, Windows Phone, Windows CE, Windows, Mac and Linux.

The major tools or building blocks are:
Form Designer
Form-Flow Designer
Form and Form-Flow Configurator
Business Rule Designer
Business Test Designer
This example will, for each of the above areas, explain:
The purpose of the tool
Definitions of relevant terms
The design of the tool
An example of usage of the tool
Form Designer Form Designer allows a business analyst to create a form that is then used as part of a product. A form is built by business analysts dragging the relevant data elements onto the form's surface. A form can also be known as a page, a surface, a portal, a web site, a dashboard or a surface. A form contains either actions (menus, buttons, tiles) and/or data elements (text-boxes, drop-downs, date-controls, grids, lists) and/or visualisation elements (charts, graphs, dashboards).

When a business analyst creates a new form, they first nominate the data or record type that they are designing for. At this point, data elements are automatically discovered and shown based on the data type of the form. These data elements are categorised into data categories such as Date/Time fields, String fields, Numeric fields, Related Lists, Related Records and Images. A business analyst can then drag on the relevant data element. Further, a business analyst can also drag on other visual elements such as panels and group-boxes to allow for a logical layout of their form. Internally, for each type of data element or control (panel/group-box), the platform has a representation of the programming code/markup that allows this control to be rendered in multiple platforms eXtensible Application Markup Language (XAML) for Windows Desktop Applications
    JavaScript Object Notation (JSON) for Windows CE
    HTML with KnockoutJS Binding for Web Browsers, iOS, Android and Windows Phone/Surface When multiple elements are dragged on to a surface, design server 220 creates an entire "file" that is the combination of those individual data elements and controls. Server 220 stores this file as part of the application as "data". This file is stored in a format that is platform neutral and represents the relevant information about the data element or control, including items such as:

The technical name of the data field that the element relates to
    Layout settings including colours, margins, sizes and positions
    Any control specific properties or options, such as whether a date control does or does not show the time element In other words, server 220 creates the forms in an intermediate language that can be transformed into device specific representation. When an individual device requests a specific form from the server, the server will understand what platform the client is using—and convert, on the fly, the stored form representation into the correct representation (XAML, JSON or HTML with KnockoutJS) and deliver the converted form to the client. The client application can then render this form as it is in a natively understood format.

Figure 17:
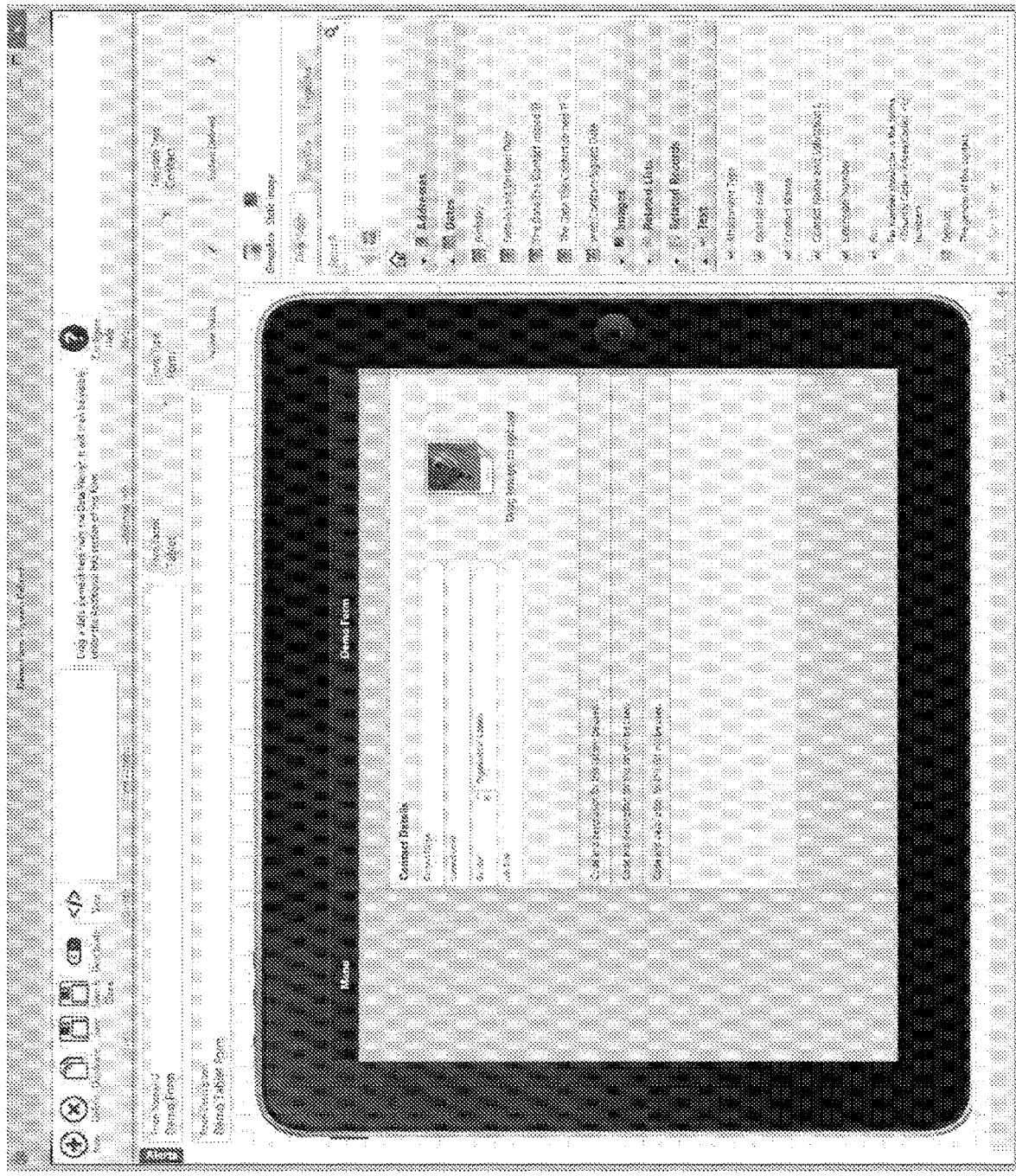
FIG. 17 shows an example of the form designer surface.

FIG. 17 shows an example of the form designer surface, with a few data elements and visual elements dragged on to the surface.

The below code shows the data representation, in Windows CE, XAML, JSON and HTML with KnockoutJS for a specific control—that being a "Textbox" control for display text/string information.

| Windows CE |
|---|
| ```
[
  {
    "type": "Label",
    "config": {
      "text": ~CaptionDetail~,
      "widthOverride": ~Width~,
      "height": 15,
      "forFieldName": "~BindingPath~",
      "font": {
        "size": 8,
        "style": "bold"
      },
      "left": ~Left~,
      "top": ~Top~
    }
  },
  {
    "type": "TextBox",
    "config": {
      "widthOverride": ~Width~,
      "heightOverride": ~Height~,
      "left": ~Left~,
      "top": ~Top~,
      "name": "~BindingPath~",
      "multiline": ~MultiLine~,
      "disabled": ~IsReadOnly~
    },
    "events": {
      "enterkeydown": {
        "action": {
``` |

```
              "method": "~OnSubmit~",
              "fields": [
                {
                  "name": "~BindingPath~",
                  "source": "field"
                }
              ]
            }
          }
        },
        "binding": {
          "name": "~BindingPath~"
        }
      }
    ]
```

HTML with KnockoutJS

```
<label
    for="~ControlID~"
    data-caption-detail="~CaptionDetail~" />
<input
    id="~ControlID~"
    type="text" data-role="gwTextBox"
    data-property="~BindingPath~"
    data-margin="~Margin~"
    data-padding="~Padding~"
    data-maxlength="~MaxLength~"
    data-readonly="~IsReadOnly~"
    data-textwrapping="~TextWrapping~"
    data-initial-focus="~IsInitialFocus~"
    data-caption-position="~CaptionPosition~"
    data-font-weight="~FontWeight~"
    data-character-casing="~CharacterCasing~"
    data-design-control-id="~DesignControlID~"
    data-can-be-hidden="~CanBeHidden~" />
```

Windows Desktop (WPF XAML)

```
<TextBox
    xmlns="http://schemas.microsoft.com/winfx/2006/xaml/presentation"
    xmlns:x="http://schemas.microsoft.com/winfx/2006/xaml"
    xmlns:meta="clr-namespace:CargoWise.Glow.UI.Infrastructure.MetaData;assembly=CargoWise.Glow.UI.Infrastructure"
    xmlns:infra="clr-namespace:CargoWise.Glow.UI.Infrastructure;assembly=CargoWise.Glow.UI.Infrastructure"
    xmlns:common="clr-namespace:CargoWise.Glow.UI.Controls;assembly=CargoWise.Glow.UI.Controls"
        infra:DesignerExtension.ControlType="TXT"
        Text="{meta:MetaDataBinding ~BindingPath~, Mode=~BindingMode~}"
        Grid.ColumnSpan="{infra:PlaceholderValue ColumnSpan}"
        Grid.Column="{infra:PlaceholderValue Column}"
        Grid.RowSpan="{infra:PlaceholderValue RowSpan}"
        Grid.Row="{infra:PlaceholderValue Row}"
        infra:ControlStateExtensions.ReadOnly="{infra:PlaceholderValue IsReadOnly}"
        Margin="{infra:PlaceholderValue Margin}"
        TextWrapping="{infra:PlaceholderValue TextWrapping}"
        FontWeight="{infra:PlaceholderValue FontWeight}"
        Style="{StaticResource InputTextBox}"
        infra:UIElementExtensions.CaptionPosition="{infra:PlaceholderValue CaptionPosition}"
        infra:UIElementExtensions.ElementCaptionOverride="{infra:Placeholder Value CaptionOverride, Converter={StaticResource EmptyStringAsNullConverter}}"
        common:BPMDependencyProvider.SuppressDependencyContributions="{infra:PlaceholderValue SuppressDependencyContributions}"
        >
    <infra:PlaceholderExtensions.Placeholders>
        <infra:PlaceholdersContainer>
            <infra:Placeholder Name="BindingPath" Value="~BindingPath~" />
            <infra:Placeholder Name="BindingMode" Value="~BindingMode~" />
            <infra:Placeholder Name="ColumnSpan" Value="~ColumnSpan~" DefaultValue="4" />
            <infra:Placeholder Name="RowSpan" Value="~RowSpan~" DefaultValue="1" />
            <infra:Placeholder Name="Column" Value="~Column~" DefaultValue="0" />
            <infra:Placeholder Name="Row" Value="~Row~" DefaultValue="0" />
            <infra:Placeholder Name="IsReadOnly" Value="~IsReadOnly~" DefaultValue="False" />
            <infra:Placeholder Name="Margin" Value="~Margin~" DefaultValue="0" />
            <infra:Placeholder Name="TextWrapping" Value="~TextWrapping~" DefaultValue="NoWrap" />
            <infra:Placeholder Name="FontWeight" Value="~FontWeight~" DefaultValue="Normal" />
            <infra:Placeholder Name="IsInitialFocus" Value="~IsInitialFocus~" DefaultValue="False" />
            <infra:Placeholder Name="CaptionPosition" Value="~CaptionPosition~" DefaultValue="Top" />
            <infra:Placeholder Name="CaptionOverride" Value="~CaptionOverride~" />
            <infra:Placeholder Name="CanBeHidden" Value="~CanBeHidden~" DefaultValue="True" />
            <infra:Placeholder Name="DesignControlID" Value="~DesignControlID~" />
            <infra:Placeholder Name="SuppressDependencyContributions" Value="~SuppressDependencyContributions~" DefaultValue="False" />
        </infra:PlaceholdersContainer>
    </infra:PlaceholderExtensions.Placeholders>
</TextBox>
```

Form-Flow Designer

The form flow designer allows a business analyst to create a flow of how a user should experience the system. Flow may be defined as the tasks that a user can complete for a specific operational purpose. The flow may contain sequential tasks, parallel, tasks, optional tasks and mandatory tasks. Some of these tasks may have a user interface, whilst some may be background tasks. When a business analyst defines a form-flow template, they are able to 'visually' (using drag and drop) build a flow-chart of how a user will experience the system. This includes the ability to:

Show a form, for data entry

Execute a background process, such as sending XML messages to a party on the job Ask the user a question in order to determine the next step Make an automatic decision based on a condition that is evaluated against the job's data Essentially, this allows non-technical resources to build an entire functional system program, that can be executed, without the need for technical coding.

This flow definition is stored in the database and can be retrieved by any client application via a web service call. The client applications (Windows Desktop, HTML, Windows CE etc) are able to then interpret this form flow definition, and perform the relevant tasks—such as showing a form to the user etc. Each client platform has an implementation of each of the task types, which is also referred to as an execution engine. This allows a single form-flow to be interpreted on any of these platforms without modification.

Figure 18:
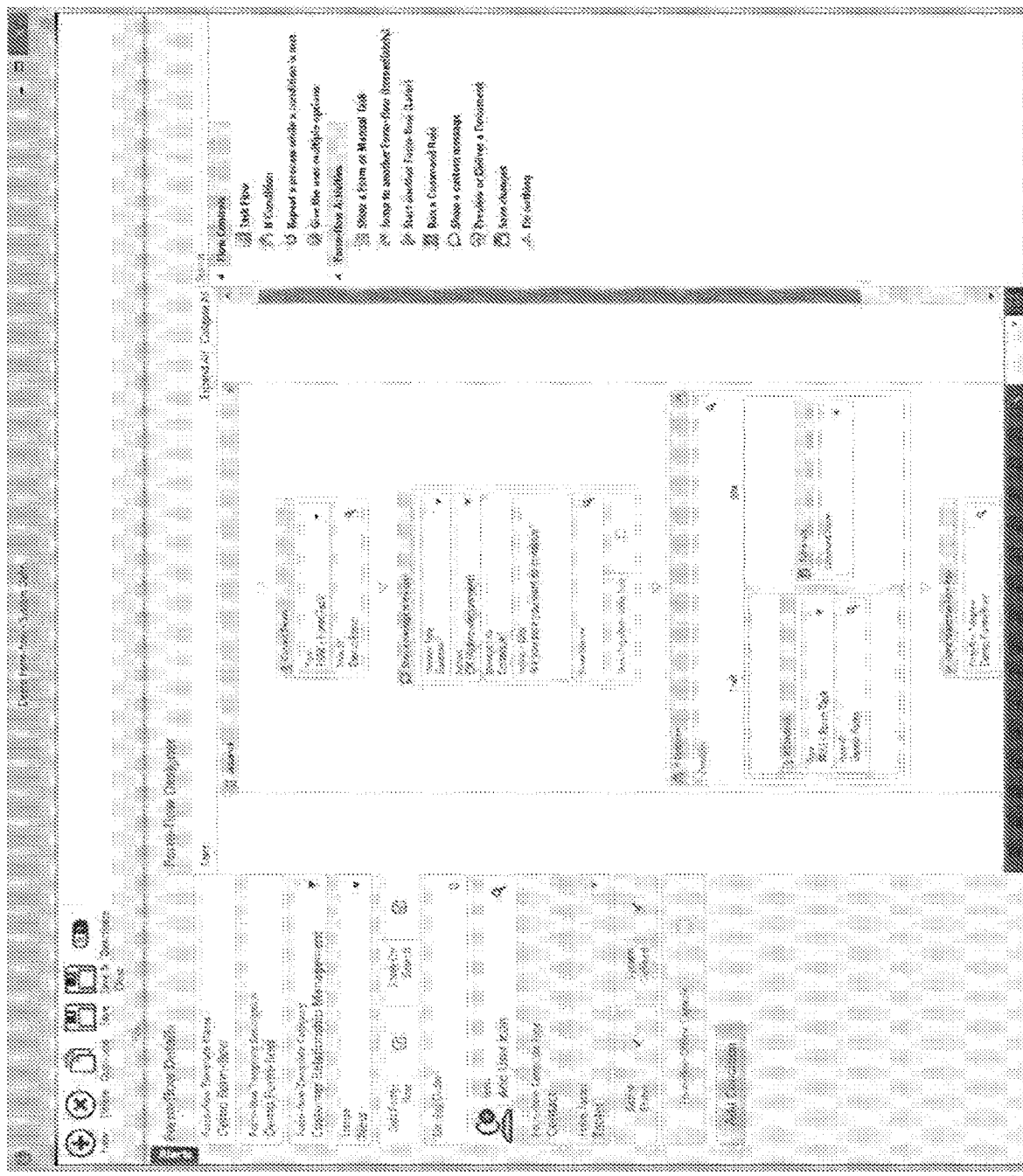
FIG. 18 shows an example of the form-flow designer surface.

FIG. 18 shows an example of the form-flow designer surface, with an example form-flow loaded.

Form and Form-Flow Configurator

The Form and Form-Flow Configurator allows a customer (end user) to configure forms and form-flows in their own system, to allow the system to be customised for their specific operations, or the specific operations of one part of their business, or even for a specific customer of theirs.

The Form Configurator controls how visual elements are displayed on a form: position, visibility (hidden/visible), and contents of certain elements, such as drop-down lists. Form-Flow Configurator allows to exclude certain parts of a form-flow that may not be applicable to a specific part of the business or a specific customer. Configuration Templates group configured items together by various parameters, such as Customer, Company, Branch, or Department. This allows users to specify the level at which a configuration template applies.

When a business analyst designs a form, he or she decides on a layout that works for the majority of users. The analyst indicates which visual elements are required, and which can be hidden by the user configuring the form. It is also possible to specify a list of additional elements that can be added to the form layout during configuration. This way the form layout can be changed within pre-defined constraints, maintaining supportability of the product. Additionally, the choices available within drop-down lists and search controls can be removed during configuration, so that only the items relevant to an area of business or a specific customer are displayed.

A form-flow may be designed to have multiple next steps, asking the user to make a selection. During form-flow configuration, some steps may be disabled, making it easier for the user to select a relevant step during run-time. Configuration Templates contain all of the above Configuration Items. A configuration template may be:

Default: applies to all users
Customer-specific: applies to users that belong to a specific customer
Company/Branch/Department-specific: applies to users that belong to a specific company, branch, or department Internally, configuration items are stored in the way that is most suitable for the type of item:

Form layout: the XAML of the configured form is stored.
List items: the excluded items are stored as XML.
Form-flow steps: the disabled steps are stored as XML.
Configuration item data format can be extended to store additional configuration types.

Figure 19:
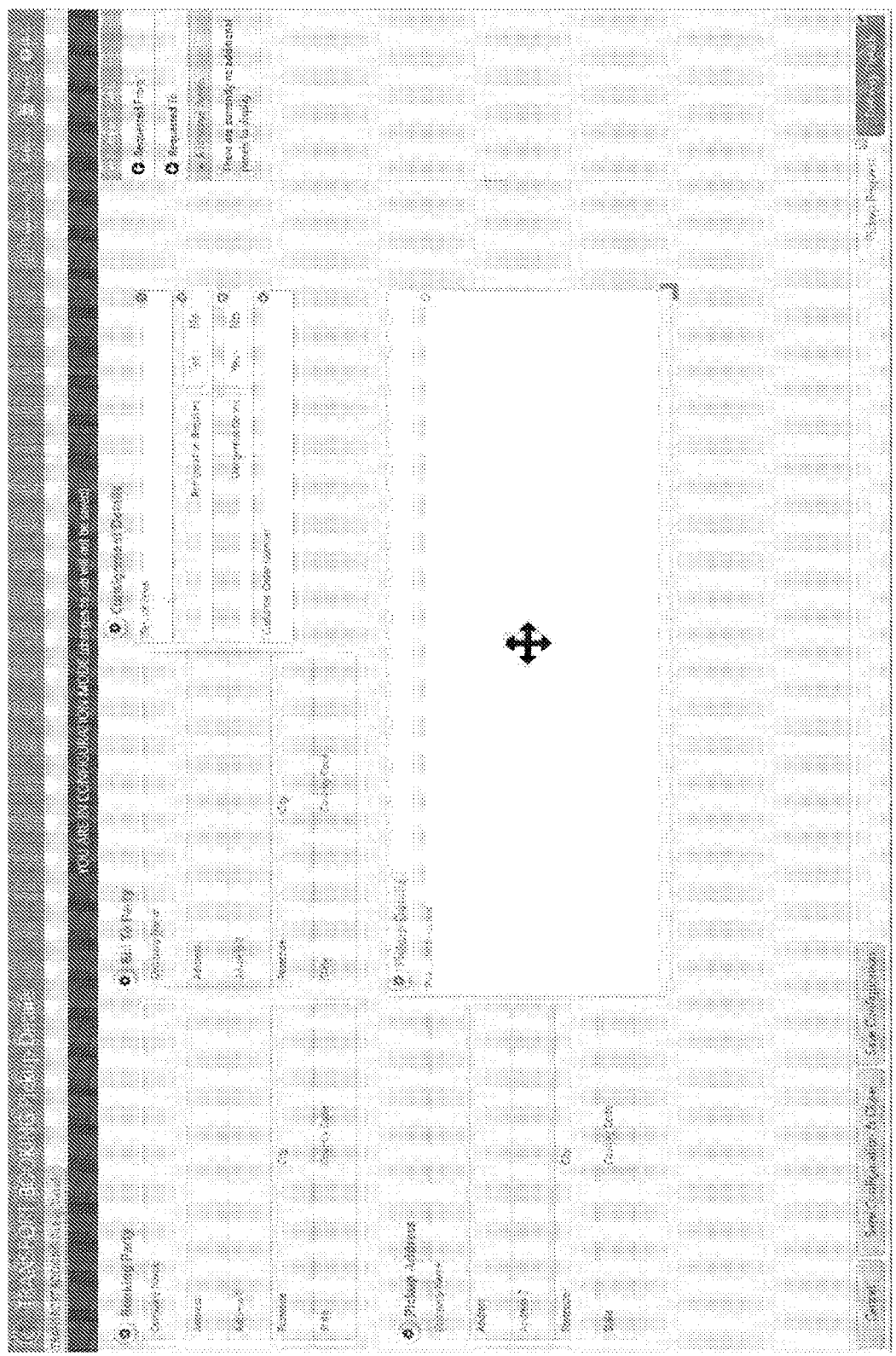
FIG. 19 shows a form-flow in configuration mode.

FIG. 19 shows a form-flow in configuration mode. In this example, the user removed several fields from a panel, disabled a form-flow step, and is about to move a panel around the form.

Figure 20:
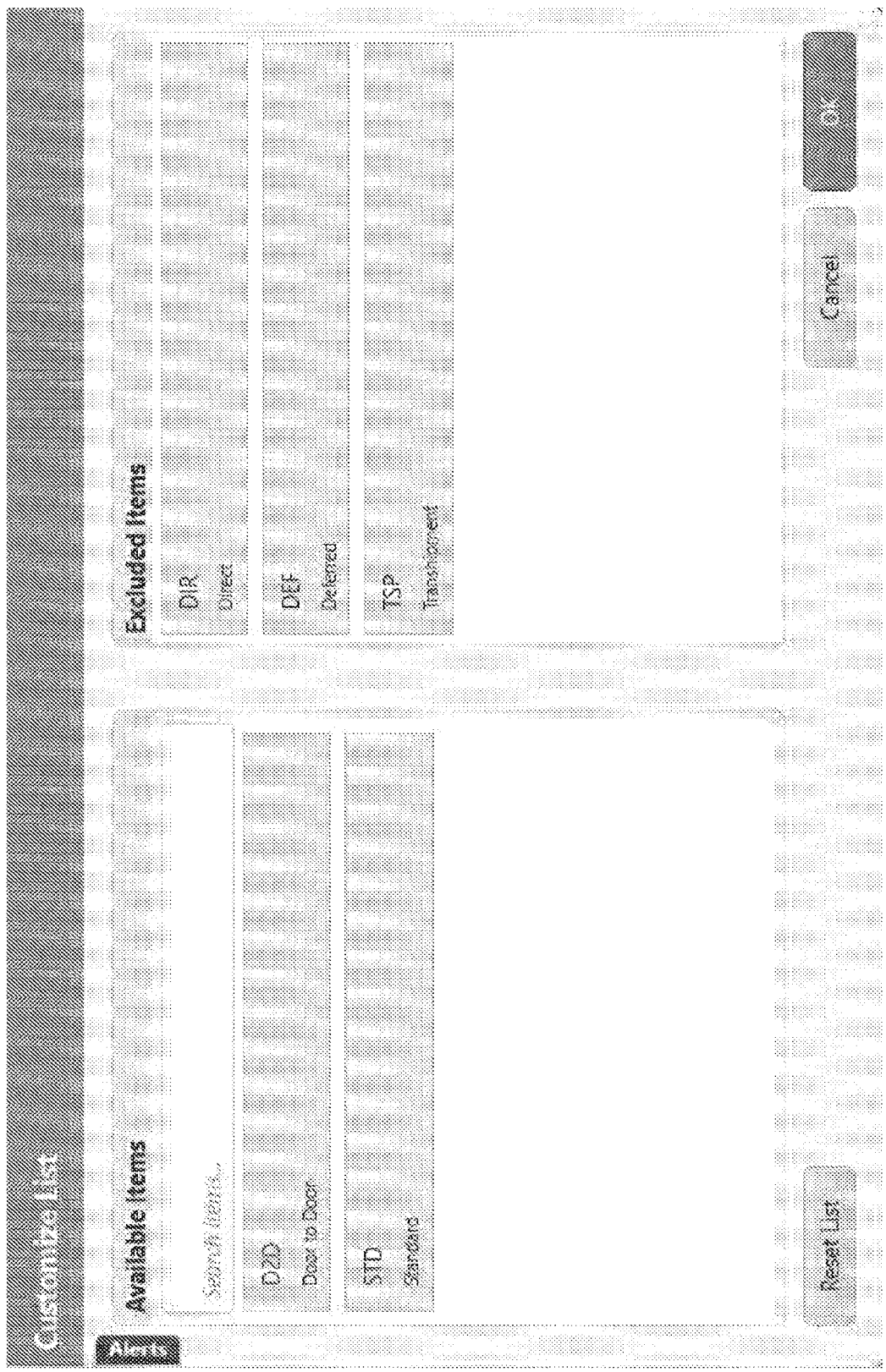
FIG. 20 demonstrates how a search control can be configured.

FIG. 20 demonstrates how a search control can be configured to exclude items that are irrelevant for a specific configuration.

The steps described herein may be performed by modules or other means within a corresponding computer system. This includes software means such as functions, classes, code files, libraries or objects as well as service means including middleware services connected by a message passing architecture. In other examples, means include hardware means, such as virtual machines, web servers, ASICs, FPGAs, CPUs and GPUs.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled. It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. For a designer device including a display device, a processor and storage, a method of correlating a form file to a form flow process file, wherein the form file includes at least one of a data type or a control type and is stored in a form file storage and a plurality of form flow process files include control types are stored in a form flow process files storage, the individual form flow process files including reference to one or more form files, the method comprising:
    displaying on the display device a representation of at least one form file;
    in response to user input via the display device referring to the form file, correlating the form file to one or more form flow process files stored in form flow process files storage, the correlating based at least in part by the data type or the control type of the form file;
    in response to the previous correlating step, initiating depiction of a list of one or more representations of form flow process files that include a reference to the form file; and
    displaying the list of one or more representations of form flow process files that relate to the form file.

2. The method of claim 1, further comprising:
    via user input, selecting from the list of one or more representations of form flow process files that relate to the form file; and
    correlating the form flow process file with the form file.

3. The method of claim 2, wherein when the form flow process file is accessed and the form file is required in the form flow process, the form file is retrieved from the form file storage.

4. The method of claim 1 wherein flow control of the form flow process file provides at least one of 'if', 'then', 'else if', 'goto', 'jump', 'while' logic between forms.

5. The method of claim 1 wherein the form file is unexecutable.

6. The method of claim 1 wherein the form file is executable.

7. A method of a computer implemented system including a display device, a processor and storage, the system for generating correlating form files with form flow process files, the method comprising:
    rendering a representation of a record on a graphical user interface, the record being of a type upon which a particular action can be performed;
    from a set of form flow process files stored in a data store, correlating at least one form flow process file which is configured to include a record of the type upon which the particular action can be performed;

rendering on the graphical user interface at least one icon representing a form flow process file from the set of form flows process files as available for selection by a user, the at least one form flow process file being configured to include a record of the type upon which the particular action can be performed; and upon receiving an instruction of a selection of a form flow process file icon, configuring the record as an executable element of the selected form flow process file so that the particular action can be performed upon the record.

8. The computer implemented system of claim 7 wherein the record is a form.

9. The computer implemented system of claim 7 wherein the particular action is dependent upon input.

10. The computer implemented system of claim 9 wherein the input is at least one user input and accessed input.

11. The computer implemented system of claim 7 wherein upon selection of a form flow process file icon, a control of the form flow process file can provide at least one of 'if', 'then', 'else if', 'goto', 'jump', 'while' logic relating to the executable element.

12. The computer implemented system of claim 7 wherein the set of form flow process files is stored in a form flow process file storage.

13. The computer implemented system of claim 7 wherein at least one of the set of form flow process files is generated within the computer implemented system.

14. A method of a computer implemented system including a display device, a processor and storage, the method accessing form flow process files stored in storage, the method comprising:

displaying a representation of a first form and a second form on a display, the first form and second form configured with at least one of a data type and a control type;

providing flow control indicia representative of executable flow controls on a display screen;

receiving instructions to select a first flow control indicium of the flow control indicia;

invoking the selected flow control in conjunction with the displayed first form and second form;

displaying on the display screen or another display screen, a first form flow diagram including an arrangement of the representations of the first form and the second form in conjunction with the invoked selected flow control;

saving a first form flow process file including an indication of the data type or control type of the first form and the second form and an indication of the selected flow control comprising a first form flow process file in storage with other form flow process files; subsequently, displaying the indicia relating to the first form;

correlating by at least one of the data type and the control type of the first form to the form flow process files stored in storage that is applicable to the first form;

displaying a representation of at least one form flow process file for selection by a user; and receiving instructions to select a form flow process file.

15. The method of claim 14 wherein the displayed representation of the at least one form flow process file for selection is a representation of the first form flow process file.

16. The method of claim 14 wherein upon selection by a user of a form flow process file, the method further comprises:

correlating a second form to associate to the selected form flow process file based upon at least one of data type and control type of the second form; and providing a representation of the determined second form on the display screen for selection by a user.

17. The method of claim 14, wherein at least one of the representations relating to the first form and the second form is unexecutable.

18. The method of claim 14, wherein at least one of the representations relating to the first form and the second form is executable.

19. The method of claim 14 wherein the flow control of the form flow process file provides at least one of 'if', 'then', 'else if', 'goto', 'jump', 'while' logic between forms.

20. A method of a computer implemented system including a display device, a processor and storage, the method for generating a form flow process file that provides control logic between at least two forms, each having at least one of a data type and a control type, comprising:

transmitting multiple flow indicia representative of flow controls and an indicia representative of at least one form to a designer device;

receiving instructions from the designer device that includes a selection of at least one flow control indicium;

invoking a flow control upon selection of the flow control indicium in conjunction with the graphical representation of the at least one form to generate a form flow diagram representative of a form flow process file that includes an arrangement of the at least one form and the at least one invoked flow control; and storing the form flow process file so that it is accessible when displaying a representation of the at least one form on the designer device.

21. The method of claim 20, further comprising correlating a form file to a form flow process file, wherein the form file is stored in a form file storage and a plurality of form flow process files including flow controls are stored in a form flow process files storage, the individual form flow process files including reference to one or more form files, the method comprising:

displaying on the display device a representation of at least one form file;

in response to user input via the display device referring to the form file, correlating to the data type or the control type of the form file that is an element of one or more form flow process files stored in form flow process files storage;

in response to the previous correlating step, initiating depiction of a list of one or more representations of form flow process files that include reference to at least one of the data type or control type of the form file; and displaying the list of one or more representations of form flow process files that relate to the form file.

* * * * *